United States Patent
Urasawa

(10) Patent No.: US 8,482,753 B2
(45) Date of Patent: Jul. 9, 2013

(54) TECHNIQUES FOR DISPLAYING MALFUNCTIONS OF THE MULTIFUNCTION PRINTER TO USERS

(75) Inventor: Koji Urasawa, Tokyo (JP)

(73) Assignee: Oki Data Corporation, Tokyo (JP)

( * ) Notice: Subject to any disclaimer, the term of this patent is extended or adjusted under 35 U.S.C. 154(b) by 134 days.

(21) Appl. No.: 13/083,682

(22) Filed: Apr. 11, 2011

(65) Prior Publication Data

US 2011/0279844 A1    Nov. 17, 2011

(30) Foreign Application Priority Data

Apr. 13, 2010  (JP) .................. 2010-092325

(51) Int. Cl.
*G06K 15/00*  (2006.01)
(52) U.S. Cl.
USPC .............. 358/1.14; 358/1.15; 358/1.16
(58) Field of Classification Search
USPC .................. 358/1.15, 1.16, 1.14
See application file for complete search history.

(56) References Cited

U.S. PATENT DOCUMENTS

| | | |
|---|---|---|
| 6,353,899 B1 | 3/2002 | Martin et al. |
| 2009/0083582 A1 | 3/2009 | Kil et al. |
| 2009/0109462 A1* | 4/2009 | Hiruma et al. ............ 358/1.13 |
| 2009/0116051 A1 | 5/2009 | Kasai |

FOREIGN PATENT DOCUMENTS

| | | |
|---|---|---|
| JP | 05-300299 A | 11/1993 |
| JP | 2007-049750 A | 2/2007 |
| JP | 2007331196 A | 12/2007 |

* cited by examiner

*Primary Examiner* — Eric A Rust
(74) *Attorney, Agent, or Firm* — Panitch Schwarze Belisario & Nadel LLP

(57) ABSTRACT

A multifunction printer is capable of performing a plurality of functions. Each function is performed by a corresponding device incorporated in the multifunction printer. The multifunction printer includes a display unit, a malfunction detecting section, and a display controller. The malfunction detecting section is configured to detect a malfunction that has occurred within the multifunction printer. When one of the plurality of functions is selected, if the malfunction detecting section has detected the malfunction, the display controller causes the display unit to display a malfunction message indicative of the malfunction.

9 Claims, 17 Drawing Sheets

| MALFUNCTION TYPE | MALFUNCTION MESSAGE | PRIORITY | DEVICE |
|---|---|---|---|
| ⋮ | ⋮ | ⋮ | ⋮ |
| 3002 | COMMUNICATION ERROR | 100 | FACSIMILE |
| ⋮ | ⋮ | ⋮ | ⋮ |
| 2005 | ADF JAM | 100 | SCANNER |
| ⋮ | ⋮ | ⋮ | ⋮ |
| 1020 | BLACK TONER EXHAUSTED | 100 | PRINTER |
| 1021 | YELLOW TONER EXHAUSTED | 100 | PRINTER |
| 1022 | MAGENTA TONER EXHAUSTED | 100 | PRINTER |
| 1023 | CYAN TONER EXHAUSTED | 100 | PRINTER |
| ⋮ | ⋮ | ⋮ | ⋮ |
| 1075 | TRAY #1 PAPER-OUT | 50 | PRINTER |
| 1076 | TRAY #2 PAPER-OUT | 50 | PRINTER |
| 1077 | TRAY #3 PAPER-OUT | 50 | PRINTER |
| ⋮ | ⋮ | ⋮ | ⋮ |

137a (columns: 137b, 137c, 137d, 137e)

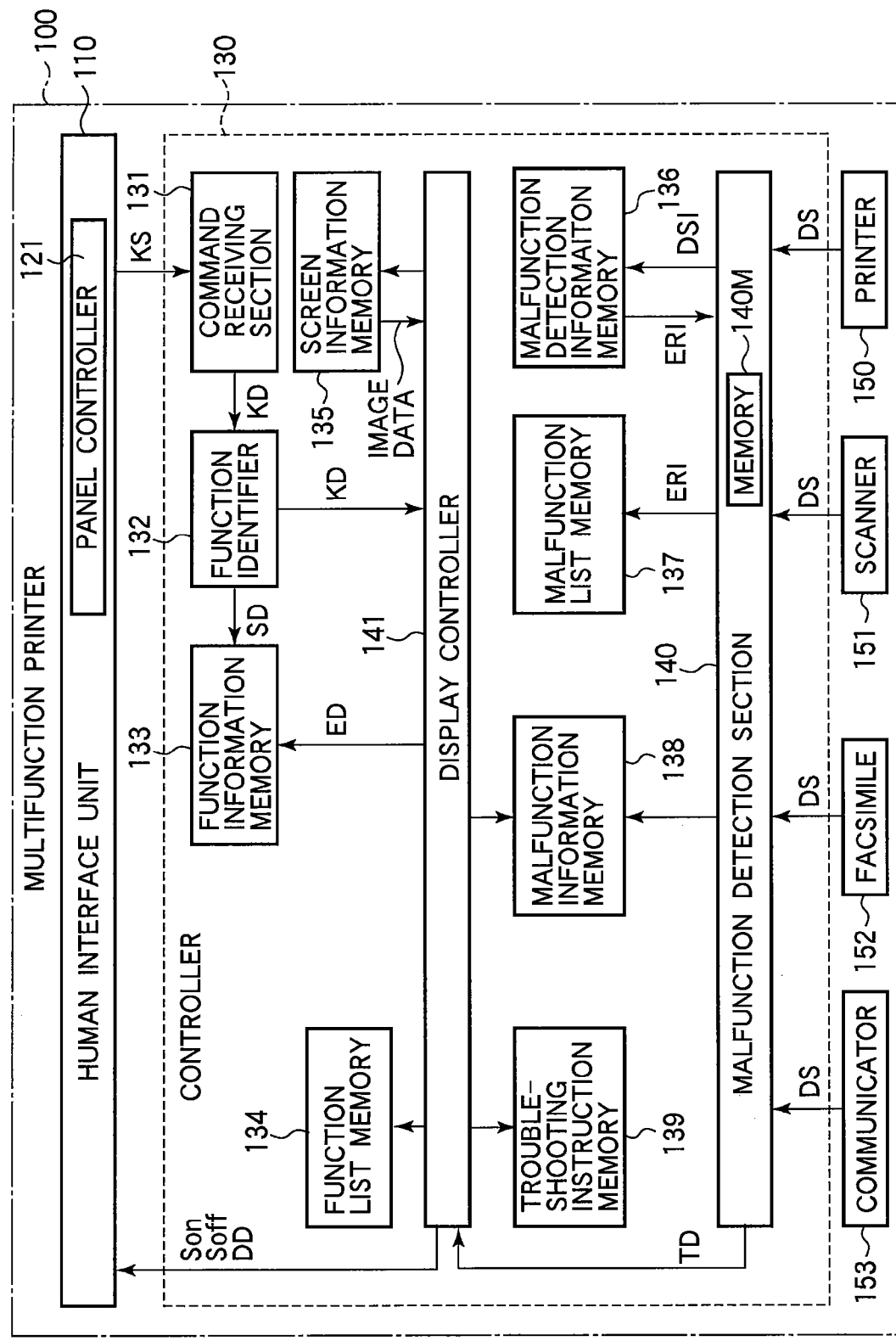

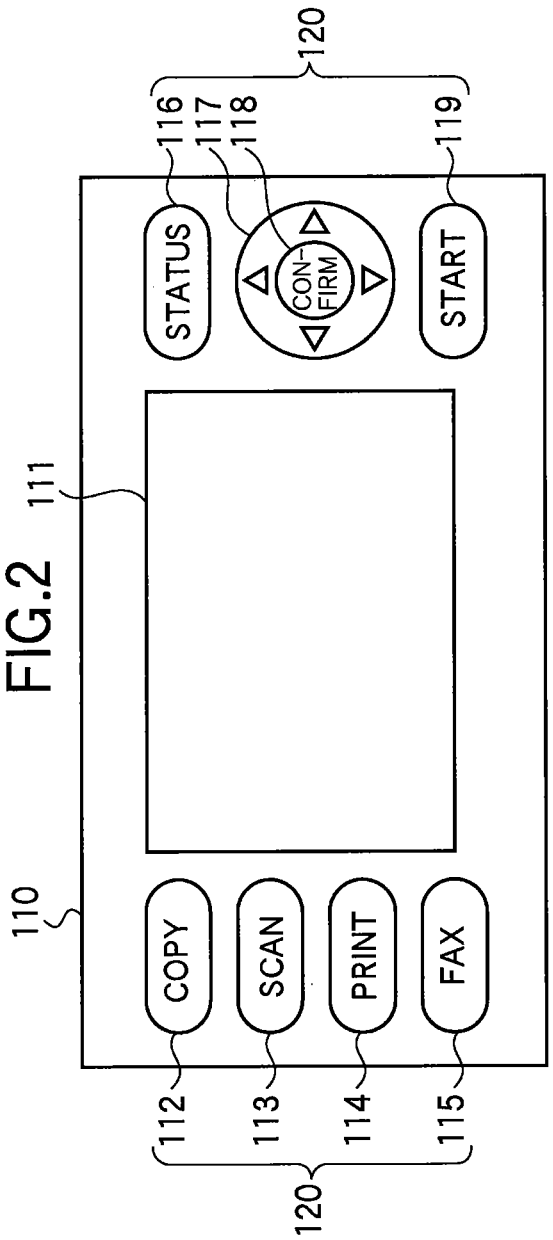

FIG.4

| MALFUNCTION TYPE | MALFUNCTION MESSAGE | PRIORITY | DEVICE |
|---|---|---|---|
| ⋮ | ⋮ | ⋮ | ⋮ |
| 3002 | COMMUNICATION ERROR | 100 | FACSIMILE |
| ⋮ | ⋮ | ⋮ | ⋮ |
| 2005 | ADF JAM | 100 | SCANNER |
| ⋮ | ⋮ | ⋮ | ⋮ |
| 1020 | BLACK TONER EXHAUSTED | 100 | PRINTER |
| 1021 | YELLOW TONER EXHAUSTED | 100 | PRINTER |
| 1022 | MAGENTA TONER EXHAUSTED | 100 | PRINTER |
| 1023 | CYAN TONER EXHAUSTED | 100 | PRINTER |
| ⋮ | ⋮ | ⋮ | ⋮ |
| 1075 | TRAY #1 PAPER-OUT | 50 | PRINTER |
| 1076 | TRAY #2 PAPER-OUT | 50 | PRINTER |
| 1077 | TRAY #3 PAPER-OUT | 50 | PRINTER |
| ⋮ | ⋮ | ⋮ | ⋮ |

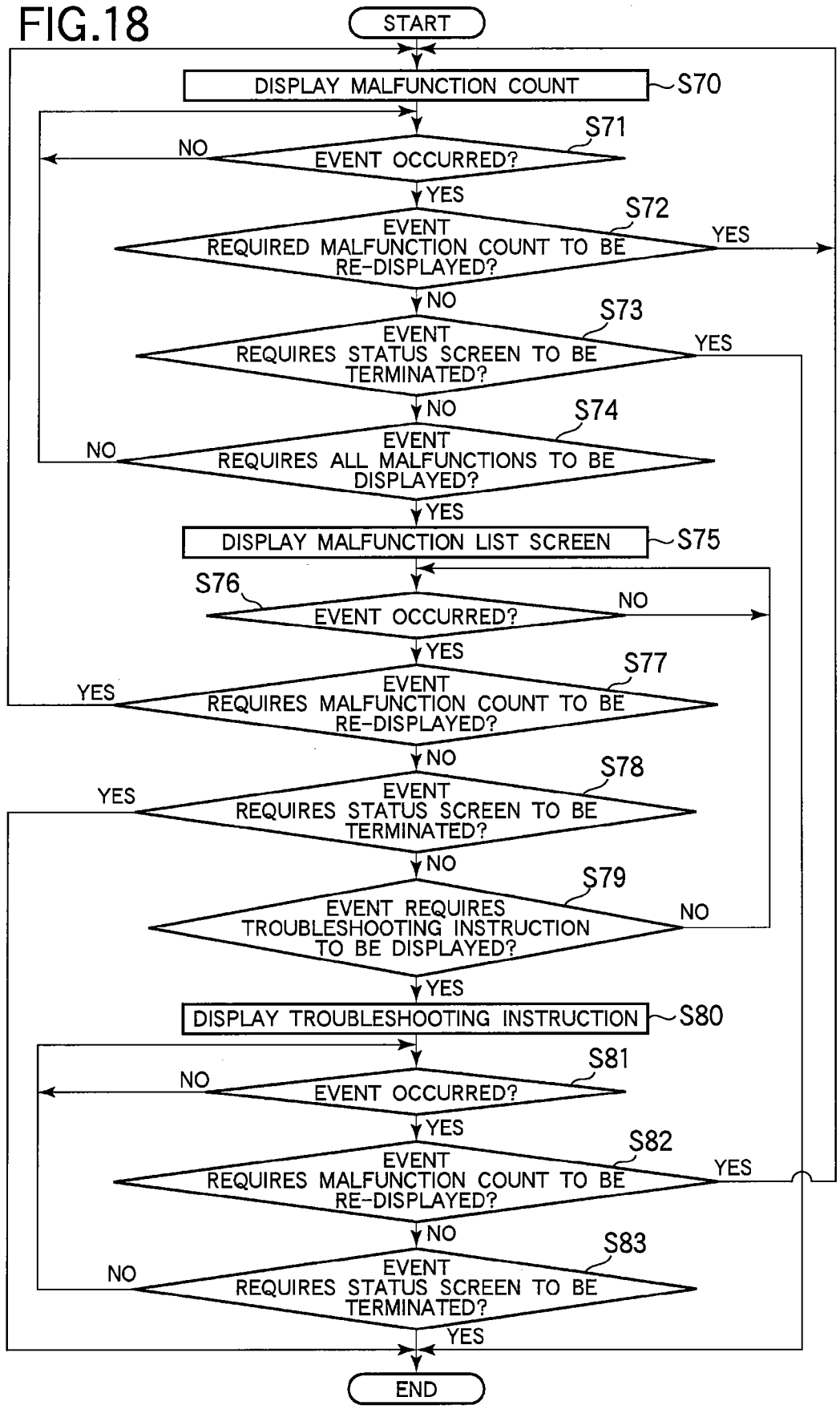

TECHNIQUES FOR DISPLAYING MALFUNCTIONS OF THE MULTIFUNCTION PRINTER TO USERS

BACKGROUND OF THE INVENTION

1. Field of the Invention

The present invention relates to a multifunction printer, and more particularly to a technique for displaying malfunctions of the multifunction printer to users.

2. Description of the Related Art

A multifunction printer performs, for example, the functions of printing, scanning, and faxing. A technique is known which displays on a display unit information indicative of a type of malfunction and a corresponding troubleshooting instruction if a multifunction printer fails. For example, Japanese Patent Application Publication No. 2007-331196 discloses a technique for displaying a list of troubleshooting instruction for remedying current malfunctions in response to a user's command.

However, the technique disclosed in Japanese Patent Application Publication No. 2007-331196 suffers from the following problems. A plurality of troubleshooting instructions are displayed in list form for remedying a plurality of malfunctions. The user has difficulty in finding the right troubleshooting instruction for a function that he wants to use. For example, the user who wants to use the function of copying does not need information on the function of facsimile.

SUMMARY OF THE INVENTION

The present invention was made in view of the above-described drawbacks.

An object of the present invention is to provide a multifunction printer in which a user may be efficiently informed of malfunctions that involve the function that the user wants to use.

A multifunction printer is capable of performing a plurality of functions. Each function is performed by a corresponding device. The multifunction printer includes a display unit, a malfunction detecting section, and a display controller. The malfunction detecting section is configured to detect a malfunction that has occurred within the multifunction printer. When one of the plurality of functions is selected, if the malfunction detecting section has detected the malfunction, the display controller causes the display unit to display a malfunction message indicative of the malfunction.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limiting the present invention, and wherein:

FIG. 1 is a block diagram illustrating a multifunction printer according to a first embodiment of the invention;

FIG. 2 illustrates the outline of a human interface unit;

FIG. 3 illustrates a function information table;

FIG. 4 illustrates a malfunction information table listing examples of malfunctions that have actually occurred in the multifunction printer;

FIG. 18 is a flowchart illustrating the processing of displaying malfunction messages and troubleshooting instructions;

DETAILED DESCRIPTION OF THE INVENTION

First Embodiment

Overall Configuration

Figure 5:
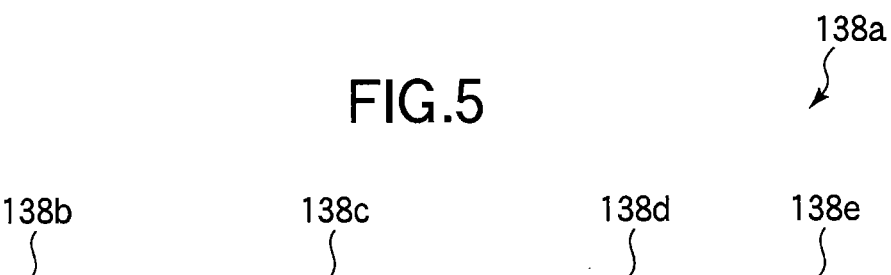
FIG. 5 illustrates the malfunction information table that lists malfunction information when malfunctions have actually occurred in the multifunction printer.

FIG. 1 is a block diagram illustrating a multifunction printer 100 according to a first embodiment of the invention. The multifunction printer 100 includes a human interface unit 110 and a controller 130. the multifunction printer 100 incorporates built-in devices including a printer 150, a scanner 151, a facsimile 152, and a communicator 153.

The controller 130 includes a command receiving section 131, a function identifier 132, a function information memory 133, a function list memory 134, a screen information memory 135, a malfunction detection information memory 136, a malfunction list memory 137, a malfunction information memory 138, a troubleshooting instruction memory 139, a malfunction detecting section 140, and a display controller 141.

FIG. 2 illustrates the outline of the human interface unit 110. The human interface unit 110 includes a display unit 111 in the form of an LCD display, a command inputting section 120, and a panel controller 121. The command inputting section 120 includes a copy key 112, a scan key 113, a print key 114, a fax key 115, a status key 116, a selection key 117, a confirmation key 118, and a start key 119. These keys are function selection keys implemented in hardware and are independent from one another.

When a user selects the function of copying, he depresses the copy key 112, and then a copy function screen appears on the display unit 111. When the user selects the scan function, he depresses the scan key 113, and then a scanner function screen appears on the display unit 111. When the user selects the printer function, he depresses the print key 114, and then a printer function screen appears on the display unit 111. When the user selects the fax function, he depresses the fax key 115, and then a fax function screen appears on the display unit 111. The copy key 112, scan key 113, print key 114, and fax key 115 are function selection keys.

The status key 16 is pressed when the user inputs a command to display items of information about malfunctions that may have occurred in the multifunction printer 100. A status screen appears on the display unit 111 when the status key 116 is depressed. The selection key 117 is pressed to switch selection from one to another, i.e., upward, downward, leftward and rightward on the screen. The confirmation key 118 is pressed when the user wants to confirm his selection on the display unit 111. The start key 119 is pressed when the user wants to initiate the selected function, selected by depressing the copy key 112, scan key 113, print key 114 or fax key 115.

When one of the copy key 112, scan key 113, print key 114, fax key 115, selection key 117, confirmation key 118, and start key 119 is depressed, the panel controller 121 sends a key signal KS indicative of depression of a corresponding key to the command receiving section 131 (FIG. 1) of the controller 130. If the selection key 117 is depressed, the panel controller 121 sends the key signal KS indicative of a direction of selection key (i.e., up, down, left, or right) to the command receiving section 131.

The copy key 112, scan key 113, print key 114, fax key 115, status key 116, and start key 119 each have a built-in light emitting element such as a light emitting diode (LED). The display controller 141 of the controller 130 generates a light-on signal $S_{ON}$ or a light-off signal $S_{OFF}$ that identifies a selected key. The panel controller 121 controls the light-on state or light-off state of the selected key in accordance with the light-on signal $S_{ON}$ or light-off signal $S_{OFF}$.

The panel controller 121 receives display data DD from the image controller 141 (FIG. 1) and processes the display data DD that describes a screen to be displayed on the display unit 111.

The command receiving section 131 receives the key signal KS from the human interface unit 110, the key signal KS identifying a depressed function key, or a direction of selection commanded by the selection key 117. The command receiving section 131 then sends key information KD to the function identifier 132.

The function identifier 132 receives the key information KD from the command receiving section 131, and sends it to the display controller 141. If the key information KD indicates the depression of the function selection key (i.e., the copy key 112, scan key 113 print key 114 or fax key 115), the function identifier 132 updates the function selection information memory 133.

The function information memory 133 holds function selection information SD which indicates selection or non-selection of the copy key 112, scan key 113, print key 114, and fax key 115.

For example, the function identifier 132 replaces the function selection information SD with the function selection information selected by the copy key 112, scan key 113 print key 114 or fax key 115, thereby updating the function selection information SD.

If the key information KD indicates the depression of the start key 119 or status key 116, the function identifier 132 replaces the function selection information SD held in the function information memory 133 with another function selection information SD indicating that no function is selected. Likewise, if the function identifier 132 receives erasure information ED generated by the display controller 141, the function identifier 132 replaces the function selection information SD with another function selection information SD indicating that no function is selected.

The function list memory 134 holds a function information table 134a that lists a variety of functions of the multifunction printer 100 and devices that perform the variety of functions.

{Function Information Table}

FIG. 3 illustrates a function information table 134a. The function information table 134a includes a row 134c that shows devices, a column 134b that shows functions, and flag entries 134d each of which is an intersection of a row and a column. The column 134b holds items of function information of the multifunction printer 100. The row 134c holds the devices of the multifunction printer 100 that perform corresponding functions. The flag information in each entry indicates whether a function in the column 134b is to be performed by a device identified by the row 134c. For example, a flag value "1" indicates that the function in the column 134b is to be performed by the device in the row 134c. A flag value "0" indicates that the function in the column 134b is not to be performed by the device in the row 134c. A device is allowed to perform a function thereof if a malfunction occurred within the device does not affect the function to be performed by the device.

Referring back to FIG. 1, the screen information memory 135 stores the image data based on which later described display data DD is produced. The display data DD is then displayed on the display unit 111 of the human interface unit 110.

The malfunction detection information memory 136 holds malfunction detection information used for identifying malfunctions that have occurred within respective devices of the multifunction printer 100. The malfunction detection information includes malfunction sensor information DSI and malfunction type ERI, which are listed in a malfunction information table (not shown). The malfunction sensor information DSI is contained in the detected malfunction information DS received from individual malfunction sensors (not shown). The sensors include those disposed in the printer 150, scanner 151, facsimile 152, and communicator 153. The malfunction type ERI is used to identify the nature of malfunction, which occurs in the multifunction printer 100, using the malfunction sensor information DSI.

{Possible Malfunctions}

FIG. 4 illustrates possible malfunction information table 137a listing examples of malfunctions that may occur in the multifunction printer 100. The malfunction list memory 137 holds the possible malfunction information table 137a, the possible malfunction information table 137a showing a list of malfunctions that may occur within the multifunction printer 100.

The possible malfunction information table 137a contains a malfunction type field 137b, a malfunction message field 137c, a priority field 137d, and a device field 137e. The malfunction type field 137b holds the malfunction types ERI therein. The malfunction message field 137c holds malfunction messages information which are messages to the user and are displayed on the display unit 111 (FIG. 2). The priority field 137d holds priority levels of items of malfunction message information in being displayed on the display unit 111, so that when the malfunction message information are displayed on the display unit 111, items of malfunction message information having a higher priority level appear above remaining items of malfunction message information having a lower priority level. The device field 137e holds device identifying information that identifies devices in which the malfunctions may occur.

Referring back to FIG. 1, the malfunction information memory 138 holds the malfunction information indicative of malfunctions detected by the malfunction detecting section 140. The malfunction information is part of the functions tabulated in the malfunction list memory 137, and indicates malfunctions detected by the individual malfunction sensors and is tabulated as a malfunction information table 138a as shown in FIG. 5.

{Malfunction Information Table}

FIG. 5 illustrates the malfunction information table 138a that lists malfunction information when malfunctions have actually occurred in the multifunction printer 100. The malfunction information table 138a contains a malfunction type field 138b, a malfunction message field 138c, a priority field 138d, and a device field 138e. These fields hold information on malfunctions identified by malfunction types ERI in the malfunction type field 137b.

{Troubleshooting Instruction Table}

Figure 6:
FIG. 6 illustrates a troubleshooting instruction table that lists procedures for troubleshooting individual malfunctions that may occur within the multifunction printer.

FIG. 6 illustrates a troubleshooting instruction table 139a that lists procedures for troubleshooting individual malfunctions that may occur within the multifunction printer 100. The troubleshooting instruction memory 139 holds the troubleshooting instruction table 139a. The troubleshooting instruction table 139a has a malfunction type field 139b and a troubleshooting instruction field 139c. The malfunction type field 139b holds the malfunction types ERI that identify a malfunction that may occur in the multifunction printer 100. The troubleshooting instruction field 139c holds troubleshooting instructions to be displayed on the display unit 111. Each troubleshooting instruction instructs a user to troubleshoot the malfunction upon occurrence of a malfunction identified by the malfunction type ERI.

The malfunction detecting section 140 detects malfunctions that occur in the printer 150, scanner 151, facsimile 152, and communicator 153 of the multifunction printer 100. Specifically, the malfunction detecting section 140 extracts the malfunction-sensor information DSI from the detected malfunction DS received from the printer 150, scanner 151, facsimile 152, or communicator 153. Then, the malfunction detecting section 140 refers to the malfunction detection information held in the malfunction detection information memory 136 using the malfunction-sensor information DSI, thereby obtaining the malfunction type ERI corresponding to the extracted malfunction-sensor information DSI.

The malfunction detecting section 140 obtains the malfunction message information, priority information, and device identifying information from the malfunction list memory 137 by using the malfunction type ERI obtained from the malfunction detection information memory 136. The malfunction detecting section 140 then stores the malfunction type ERI, the malfunction message information, priority information, and device identifying information into the malfunction type field 138b, malfunction message field 138c, priority field 138d, and device field 138e of the malfunction information table 138a, respectively.

Once the malfunction of the multifunction printer 100 has been remedied, the malfunction detecting 140 deletes the information identified by the malfunction type ERI from the malfunction type field 138b. For example, the malfunction detecting section 140 holds in a memory 140M the malfunction-sensor information DSI, which has been extracted from the detected malfunction DS received from the printer 150, scanner 151, facsimile 152, and communicator 153.

After the malfunction information table 138a is updated, the malfunction detecting section 140 sends the malfunction update information TD to the display controller 141.

The display controller 141 performs the processing of the key information KD received from the function identifier 132.

{Depressing Function Selection Keys}

If the key information KD indicates the depression of one of the function selection keys, i.e., the copy key 112, scan key 113, print key 114 or fax key 115, the display controller 141 obtains device identifying information from the 134a, device identifying information indicating that a device that is to perform a function selected by the depressed key. The display controller 141 first locates an entry in the column 134b that holds a function specified by the depression of one of the copy key 112, scan key 113, print key 114 or fax key 115, and then obtains the device identifying information held in the column 134c at an intersection of the column and row where the flag value "1" is held.

If the devices field 138e does not hold the device identifying information obtained from the 134a, the display controller 141 obtains image data that describes a function screen, from the screen information memory 135, the function screen being associated with an input key represented by the information KD received from the function identifier 132. Then, the display controller 141 adds information, which indicates non-malfunction of the device that is to perform the function, to a predetermined area of the image data obtained from the screen information memory 135, thereby producing the display data DD. The display controller 141 then sends the produced display data DD to the human interface unit 110.

If the device field 138e holds the device identifying information obtained from the function information table 134a, the display controller 141 obtains the malfunction message information from the malfunction message field 138c. The display controller 141 obtains image data from the screen information memory 135, the image data describing the function screen corresponding to one of the copy key 112, a scan key 113, a print key 114, a fax key 115, a status key 116, a selection key 117 represented by the key information KD received from the function identifier 132.

The display controller 141 adds the malfunction message information, obtained from the malfunction information table 138a (FIG. 5), into a predetermined area of the image data obtained from the screen information memory 135, thereby producing the display data DD. The display controller 141 then sends the produced display data DD to the human interface unit 110. As a result, the display unit 111 of the human interface unit 110 displays the malfunction message generated based on the malfunction message information.

In this manner, if one of the copy key 112, scan key 113, print key 114, and fax key 115 is depressed by the user, the display controller 141 selects only malfunction message information indicative of a malfunction occurring in the device that is to perform the function specified by the depressed key. The display controller 141 then causes the display unit 111 to display the malfunction message generated based on the selected malfunction message information.

If the device filed 138e contains two or more entries that have device identifying information obtained from the function information table 134a, the display controller 141 obtains the malfunction message information for a device having the highest priority level determined based on the priority information held in the priority field 138d.

If two or more entries have the highest priority level, the display controller 141 adds a plurality of items of malfunction message information, obtained from the malfunction information table 138a (FIG. 5), into predetermined two or more areas of the image data obtained from the screen information memory 135, and then sends the thus produced respective items of display data DD to the human interface unit 110.

If two or more entries have the highest priority level determined based on the priority information, the malfunction message information may be obtained from an entry above the remaining locations in the malfunction information table 138a.

The display unit 111 displays a screen described by the display data DD such that when one of the copy key 112, scan key 113, print key 114, and fax key 115 is depressed, a screen corresponding to a most recently depressed key overrides the previous screen.

{Depressing Status Key}

If the key information KD received from the function identifier 132 indicates the depression of the status key 116, the human interface unit 141 obtains the image data, which describes the status screen, from the screen information memory 135. If the malfunction information table 138a has no information in any entry, the display controller 141 adds information, which indicates that no malfunction has occurred, into a predetermined area of the image data obtained from the screen information memory 135, thereby producing the display data DD. The display controller 141 then sends the thus produced display data DD to the human interface unit 110.

When the key information KD indicates the depression of the status key 116, if the entries of the malfunction information table 138a have some information, the display controller 141 obtains the malfunction message information from the malfunction message field 138c. The display controller 141 obtains image data that describes the status screen from the screen information memory 135. The display controller 141 adds the malfunction message information, which is obtained from the malfunction information table 138a, into a predetermined area of the image data obtained from the screen information memory 135, thereby producing the display data DD. The display controller 141 then sends the produced display data DD to the human interface unit 110.

If the malfunction information table 138a holds two or more items of information, the display data DD is produced such that a malfunction message having a higher priority level is displayed above those having a lower priority level. For example, if the priority field 138d holds more than two identical priority levels therein, the malfunction message information may be displayed such that one listed above the others in the malfunction information table 138a is displayed above the others on the display unit 111.

{Depressing Selection Key}

If the key information KD represents a direction in which the selection key 117 is switched from one to another, the display controller 141 obtains the display data DD from the screen information memory 135, the display data DD representing a selected item on the screen. The display controller 141 then sends the thus obtained display data DD to the human interface unit 110.

If the key information KD represents the depression of the confirmation key 118 (FIG. 2), the display controller 141 commands the printer 150, scanner 151, facsimile 152, or communicator 153 to perform the function confirmed by the confirmation key 118. Thus, the confirmed function is carried out. In addition, if the function confirmed by the confirmation key 118 is to be cancelled, the display controller 141 sends the erasure information ED to the function information memory 133. If the key information KD represents the depression of the start key 119, the display controller 141 sends a command to perform the function of a corresponding one of the printer 150, scanner 151, facsimile 152, or communicator 153, which in turn begins to perform a function thereof.

The printer 150 performs the function of printing of the multifunction printer 100. The scanner 151 performs the function of scanning. The facsimile 152 performs the function of faxing. The communicator 153 performs the function of communicating with the network (not shown). Each of the printer 150, scanner 151, facsimile 152, and communicator 153 constitutes a part of the multifunction printer 100. These devices may be configured to be completely independent from one another or to share some components. The printer 150, scanner 151, facsimile 152, and communicator 153 each have a sensor (not shown) for detecting a malfunction therein. Upon detection of a malfunction, a sensor sends the detected malfunction DS containing the malfunction-sensor information DSI that identifies the sensor that has detected the malfunction.

{Detecting Malfunction and Remedy}

Figure 7:
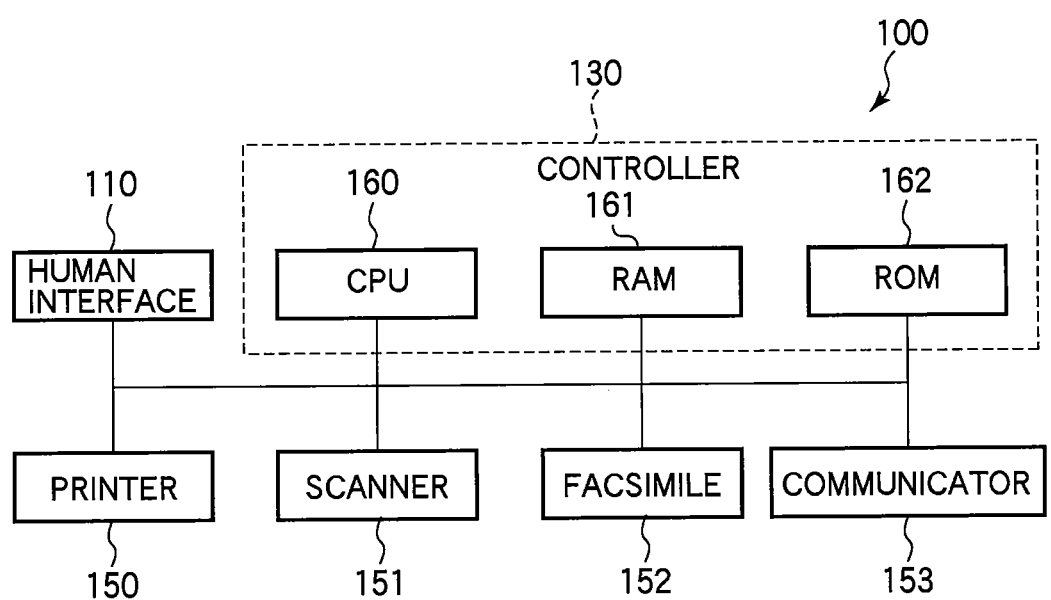
FIG. 7 is a block diagram illustrating the hardware configuration of a controller.

FIG. 7 is a block diagram illustrating the hardware configuration of the controller 130. The multifunction printer 100 is constituted of the human interface unit 110, controller 130, printer 150, scanner 151, facsimile 152, and communicator 153. The controller 130 includes a central processing unit (CPU) 160, a random access memory (RAM) 161, a read only memory (ROM) 162. The CPU 160 executes programs stored in the ROM 162, thereby implementing the command receiving section 131, function identifier 132, display controller 141, and malfunction detecting section 140. The function list memory 134, screen information memory 135, malfunction detection information memory 136, malfunction list memory 137, and troubleshooting instruction memory 139 are implemented in software and stored in the ROM 162. The function information memory 133 and malfunction information memory 138 are defined in the RAM 161.

{Flowchart of Detection of Malfunction and Remedy of Malfunction}

Figure 8:
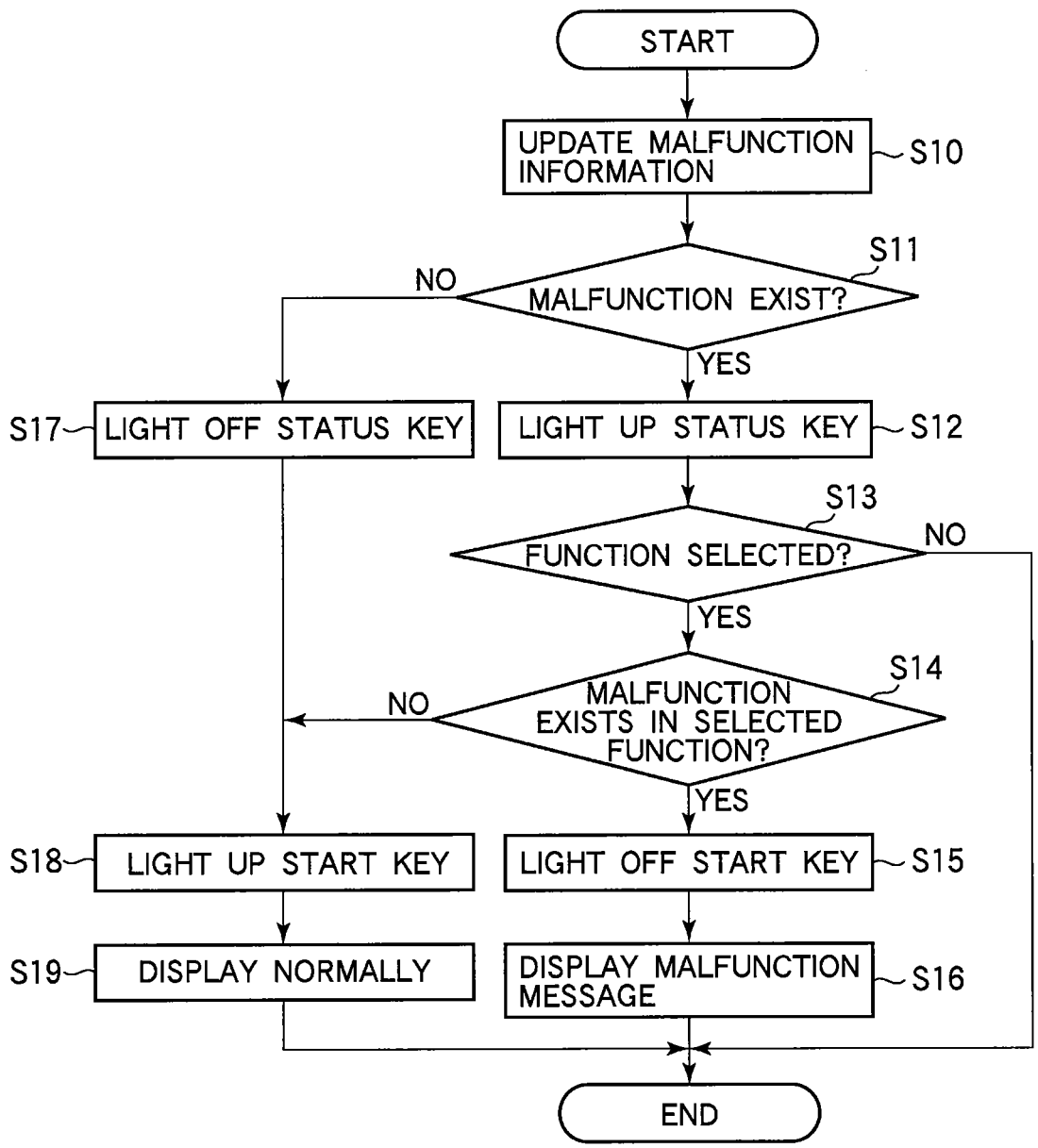
FIG. 8 is a flowchart illustrating the detection of a malfunction and remedy of the malfunction.

FIG. 8 is a flowchart illustrating the detection of a malfunction and remedy of the malfunction. If the malfunction detecting section 140 detects a malfunction that occurred in the printer 150, scanner 151, facsimile 152 or communicator 153 or the remedy of the malfunction, the malfunction detecting section 140 updates the malfunction information table 138a held in the malfunction information memory 138 (S10). After updating the malfunction information table 138a, the malfunction detecting section 140 sends the malfunction update information TD to the display controller 141.

In response to the malfunction update information TD, the display controller 141 makes a decision to determine whether a malfunction has occurred in the printer 150, scanner 151, facsimile 152, or communicator 153 (S11). If a malfunction has occurred (YES at S11), the display controller 141 proceeds to S12. If a malfunction has not occurred (NO at S11), the display controller 141 proceeds to S17.

At S12, the display controller 141 causes the status key 116 to light up. Specifically, the display controller 141 generates the light-on signal $S_{ON}$ that causes the status key 116 to light up, and sends the light-on signal $S_{ON}$ to the human interface unit 110. The panel controller 121 of the human interface unit 110 causes the light emitting element in the status key 116 to light up. If the light emitting element has already lighted up, the panel controller 121 maintains the light-on state of the light emitting element. Subsequently, the display controller 141 proceeds to S13.

At S13, the display controller 141 refers to the function information memory 133, thereby determining based on the function selection information SD whether one of the function selection keys (i.e., printer 150, scanner 151, facsimile 152, or communicator 153) has been depressed to select a corresponding function. If a function has been selected (YES at S13), the display controller 141 proceeds to S14. If a function has not been selected yet (NO at S13), the display controller 141 terminates the processing.

At S14, the display controller 141 makes a decision to determine whether a malfunction has occurred in a device that is to perform the selected function. Specifically, the display controller 141 obtains the device identifying information from the function information table 134a (FIG. 3), the device identifying information representing a device that performs the function. If the device field 138e holds the obtained device identifying information, then the display controller 141 determines that a malfunction exists in a device that is to perform the selected function. If the devices field 138e does not hold the obtained device identifying information, then the display controller 141 determines that a malfunction does not exist in a device that is to perform the selected function. If no malfunction exists in the device that is to perform the selected function (NO at S14), the display controller 141 proceeds to S18. If a malfunction exists in the device that is to perform the selected function (YES at S14), the display controller 141 proceeds to S15.

At S15, the display controller 141 causes the start key 112 to light off. Specifically, the display controller 141 generates the light-off signal $S_{OFF}$ that causes the start key 119 to light off, and sends the light-off signal $S_{OFF}$ to the human interface unit 110. The panel controller 121 of the human interface unit 110 causes the light emitting element in the start key 112 to light off. The display controller 141 then proceeds to S16. If the light emitting elements has lighted off already, the panel controller 121 maintains the light-off state of the light emitting element.

At S16, the display controller 141 provides the display data DD, which contains information indicating that a malfunction exists in a device that is to perform the function, to the human interface unit 110. The human interface unit 110 in turn causes the display unit 111 to display the function screen described by the received display data DD. Specifically, the display controller 141 obtains the malfunction message information from the malfunction message field 138c, the malfunction message information representing a device selected at S13. If two or more entries in the malfunction message field 138c have malfunction message information, the malfunction message information having the highest priority level shown in the priority field 138d is obtained.

The display controller 141 then obtains image data, which describes the function confirmed at S13, from the screen information memory 135.

Next, the display controller 141 adds the obtained malfunction message information into a predetermined area of the obtained image data, thereby producing the display data DD. The display controller 141 sends the display data DD to the human interface unit 110.

If the malfunction information table 138a holds two or more items of malfunction message information, the display controller 141 sends each item of display data DD that describes a corresponding malfunction message information to the human interface unit 110, so that the function screens described by these items of display data DD can be displayed in a cyclic manner on the display unit 111.

Figure 9A:
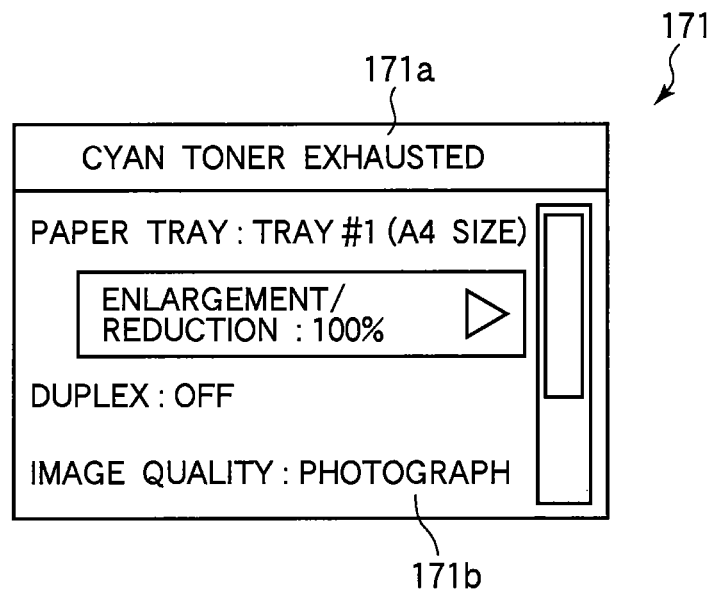
FIG. 9A illustrates a function screen displayed on the display unit when a malfunction exists in the selected function of the multifunction printer.

For example, at S16, the display unit 111 displays a function screen 171 as shown in FIG. 9A. FIG. 9A illustrates the function screen 171 displayed on the display unit 111 when a malfunction exists in the selected function of the multifunction printer 100. The function screen 171 is, for example, a copy function screen when the copy function has been selected. The function screen 171 includes a status area 171a and a parameter area 171b.

The status area 171a shows an item of information, for example, "CYAN TONER IS EXHAUSTED" indicative of the occurrence of a malfunction in a device that is to perform the copy function.

The malfunction message information that appears in the status area 171a is obtained from the malfunction message field 138c of the malfunction information table 138a held in the malfunction information memory 138.

The malfunction message information that appears in the status area 171a relates to the copy function only. Thus, even if a malfunction occurs in the scanner and/or the facsimile, no malfunction information appears in the status area 171a.

As described above, the display unit 111 displays only the malfunction message information indicative of a malfunction occurring in a device that is to perform a corresponding selected function. Thus, an image, which contains the malfunction message represented by the selected malfunction message information, is displayed on the display unit 111.

At S17, the display controller 141 causes the status key 116 (FIG. 2) to light off. Specifically, the display controller 141 generates the light-off signal $S_{OFF}$ that causes the status key 116 to light off, and sends the light-off signal $S_{OFF}$ to the human interface unit 110. The panel controller 121 of the human interface unit 110 causes the light emitting element in the status key 116 to light off. If the light emitting element in the status key 116 has already been lighted off, the panel controller 121 maintains the light-off state of the light emitting element. Subsequently, the display controller 141 proceeds to S18.

At S18, the display controller 141 causes the start key 119 to light up. Specifically, the display controller 141 generates the light-on signal $S_{ON}$ for the start key 119 to light up, and sends the light-on signal $S_{ON}$ to the human interface unit 110. The panel controller 121 of the human interface unit 110 causes the light emitting element in the start key 119 to light up. If the light emitting element in the start key 119 has already lighted up, the panel controller 121 maintains the light-on state of the light emitting element. Subsequently, the display controller 141 proceeds to S19.

At S19, the display controller 141 provides the display data DD, which contains information indicative of no malfunction in a device that is to perform the function, to the human interface unit 110. The human interface 110, in turn, causes the display unit 111 to display the function screen, described by the display data DD, on the display unit 111.

Figure 9B:
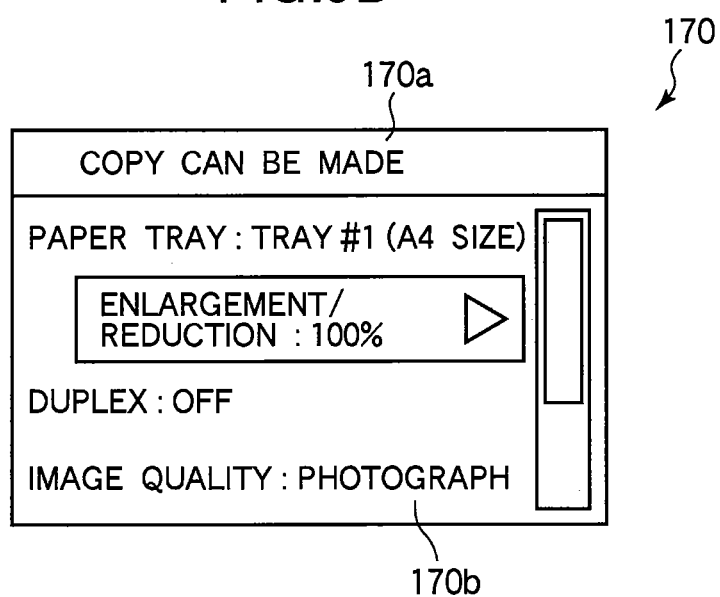
FIG. 9B illustrates a function screen displayed on a display unit when no malfunction occurs in a selected function of the multifunction printer.

FIG. 9B illustrates a function screen 170 displayed on the display unit 111 when no malfunction occurs in the selected function of the multifunction printer 100. The function screen 170 is, for example, a copy function screen when the copy function has been selected, and includes a status area 170*a* and a parameter area 170*b*.

The status area 170*a* shows information, for example, "COPY CAN BE MADE" indicative of the normal state of the device that is to perform the copy function.

The parameter area 170*b* shows items of parameter to be selected when the copy function is used. The items of parameter can be selected by means of the selection key 117. The selected item is enclosed by a square box by which the user can visually check his selection. Alternatively, the characters and background of a selected item may be reverse-displayed, thereby allowing the user to visually check his selection.

{Flowchart when Function Key is Depressed}

Figure 10:
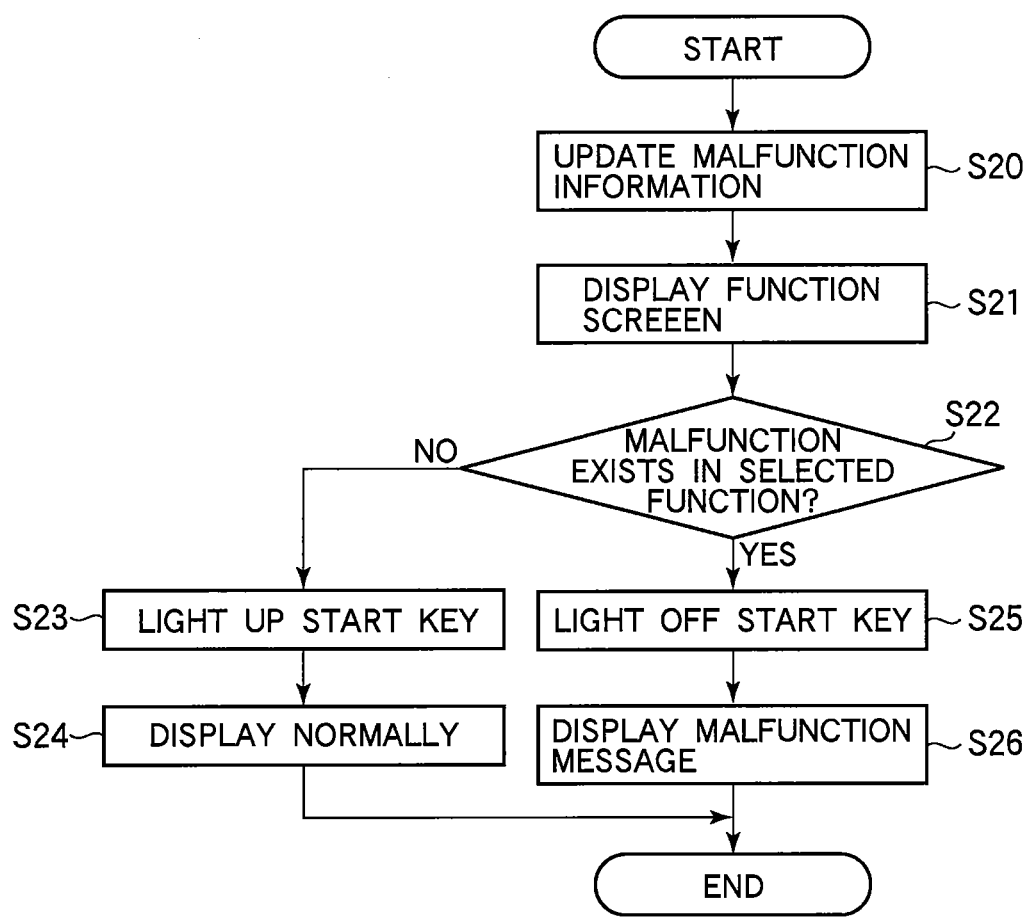
FIG. 10 is a flowchart illustrating the processing when one of copy key, scan key, print key and fax key is depressed.

FIG. 10 is a flowchart illustrating the processing when one of the copy key 112, scan key 113, print key 114 and fax key 115 is depressed. If any one of the copy key 112, scan key 113, print key 114 and fax key 115 is depressed, the human interface unit 110 sends the key signal KS indicative of the depressed key to the command receiving section 131. In response to the key signal KS, the command receiving section 131 extracts information that identifies an input key from the key signal KS, and sends the information as the key information KD to the function identifier 132. In response to the key information KD, the function identifier 132 updates the function selection information SD held in the function information memory 133 (S20). Also, the function identifier 132 sends the key information KD received from the command receiving section 131 to the display controller 141.

In response to the key information KD, the display controller 141 obtains the image data for a function screen, which is represented by the key information KD, from the screen information memory 135. The display controller 141 then sends the received display data DD to the human interface unit 110, which in turn causes the display unit 111 to display the display data DD (S21).

If no malfunction has been detected at S21, a message indicating that no malfunction has occurred may be shown in the status area 171*a* as shown in FIG. 9B.

For some applications, the status area 170*a* shown in FIG. 9B and the status area 171*a* shown in FIG. 9A may be configured not to show a message indicative of the occurrence of malfunction or a message indicative of the non-occurrence of malfunction. For example, the status area 171*a* need not even show any message. Instead, the status area 171*a* may show other message, for example, "IN PREPARATION" or "CHECKING FOR MALFUNCTION". These messages do not identify whether a malfunction has occurred, and can be added via the display controller 141 to the image data obtained from the screen information memory 135.

The display controller 141 makes a decision to determine whether a malfunction has occurred in a device that is to perform a function thereof (S22). If no malfunction has occurred (NO at S22), the display controller 141 proceeds to S23. If a malfunction has occurred (YES at S22), the display controller 141 proceeds to S25.

At S23, the display controller 141 causes the start key 119 to light up, and then proceeds to S24. At S24, the display controller 141 sends the display data DD that describes a function screen to the human interface unit 110, the function screen showing that no malfunction has occurred in the device. The human interface unit 110 in turn causes the display unit 111 to display the function screen.

At S25, the display controller 141 causes the start key 119 to light off, and then proceeds to S26. At S26, the display controller 141 sends the display data DD that describes a function screen to the human interface unit 110. This function screen shows that a malfunction has occurred in the device. The human interface unit 110 in turn causes the display unit 111 to display the function screen.

{Depressing Status Key}

Figure 11:
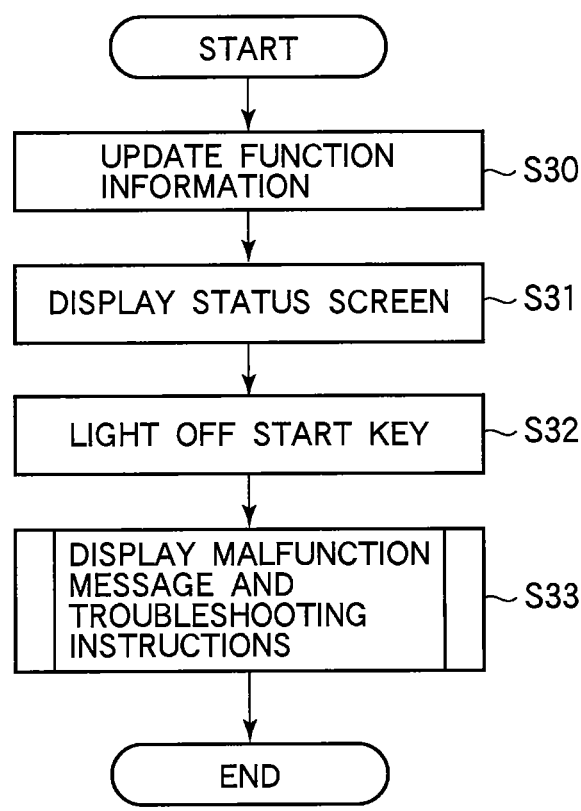
FIG. 11 is a flowchart illustrating the processing when a status key is depressed.

FIG. 11 is a flowchart illustrating the processing when the status key 116 is depressed. Upon depression of the status key 116, the human interface unit 110 provides the key signal KS indicative of the depression of the status key 116 to the command receiving section 131. In response to the key signal KS, the command receiving section 131 extracts information indicative of the key information KD and sends the key information KD to the function identifier 132. The function identifier 132 then updates the function selection information SD, held in the function information memory 133, with the key information KD (S30). Since the status key 116 is not a function key, the function selection information SD in the function information memory 133 is replaced by the information indicating that no function has been selected. The function identifier 132 sends the key information KD received from the command receiving section 131 to the display the controller 141.

Upon reception of the key information KD, the display controller 141 obtains image data that describes the status screen corresponding to the status key 116 from the screen information memory 135. The display controller 141 then sends the obtained display data DD to the human interface unit 110, which in turn causes the display unit 111 to display the status screen (S31).

A message that no malfunction has occurred may be shown in the status screen.

For some applications, the status screen may be configured to show neither a message indicating that no malfunction has occurred nor a message indicating that a malfunction has occurred. In fact, the status screen need not show any message. Instead, the status screen may show other messages, for example, "IN PREPARATION" or "CHECKING FOR MALFUNCTION". These messages do not identify whether a malfunction has occurred, and can be added via the display controller 141 to the image data obtained from the screen information memory 135.

Next, the display controller 141 causes the start key 119 to light off (S32). The display controller 141 performs the processing in which malfunction messages and troubleshooting instructions are displayed (S33). Step S33 will be described in detail with reference to FIG. 12.

{Flowchart for Displaying Malfunction Message and Troubleshooting Instruction}

Figure 12:
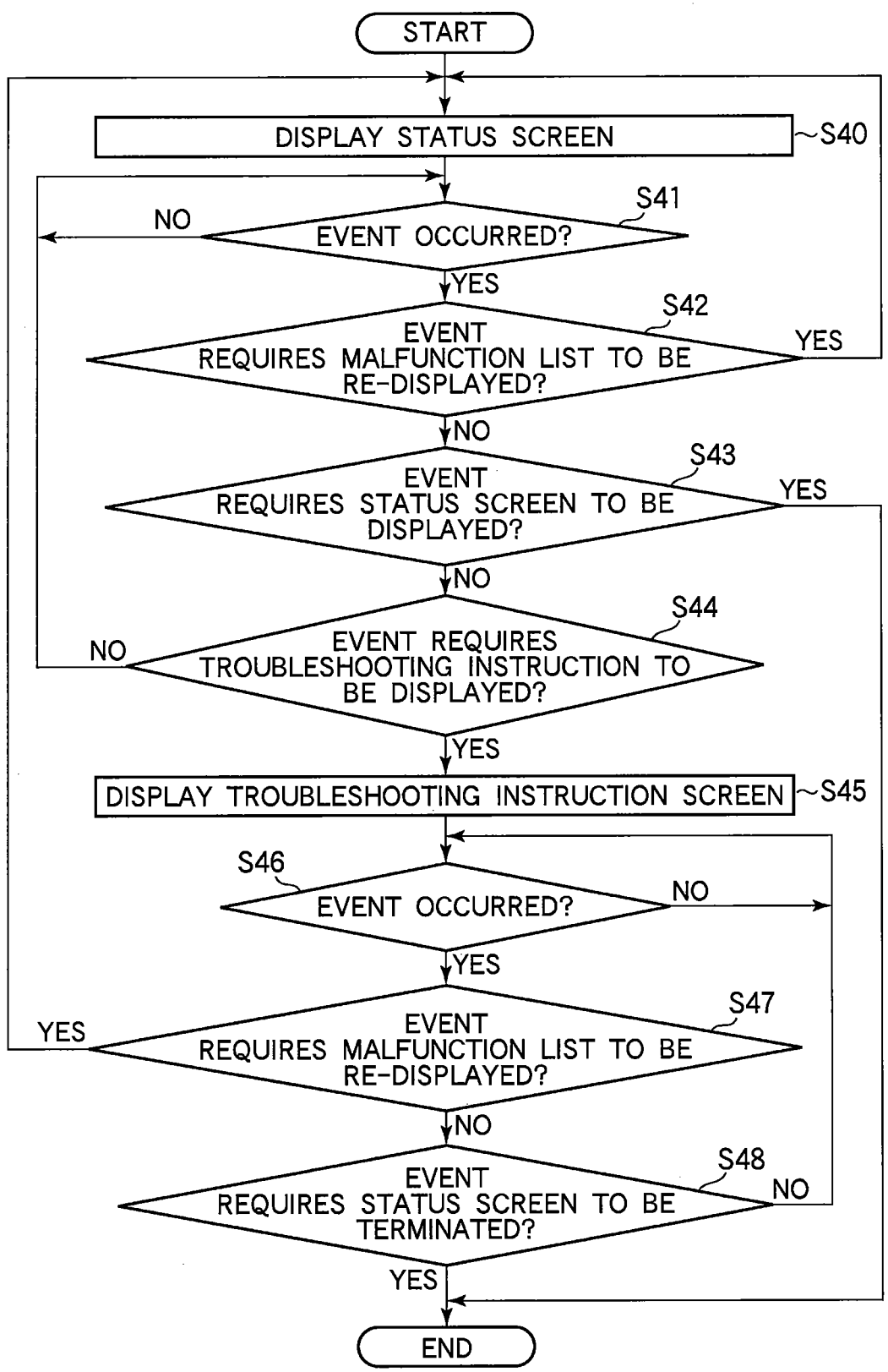
FIG. 12 is a flowchart illustrating the processing in which malfunction messages and troubleshooting instructions are displayed.

FIG. 12 is a flowchart illustrating the processing in which the malfunction messages and troubleshooting instructions are displayed. The display controller 141 causes the display unit 111 to display the malfunction list (S40).

If the malfunction information table 138*a* held in the malfunction information memory 138 does have information in any entry thereof, the display controller 141 adds message information, which indicates that a malfunction has not occurred, into a predetermined area of the image data obtained from the screen information memory 135, thereby producing the display data DD. The display controller 141 then sends the display data DD to the human interface unit 110. The display unit 110 in turn causes the display unit 111 to display the status screen described by the display data DD.

Figure 13A:
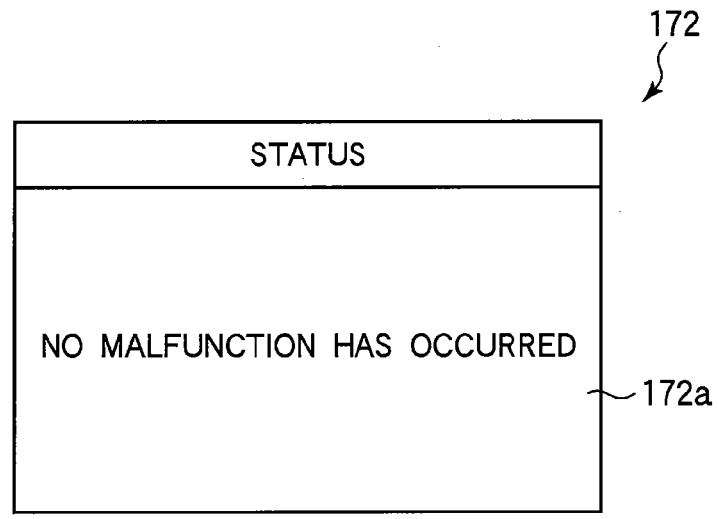
FIG. 13A illustrates a status screen.

FIG. 13A illustrates a status screen 172. For example, the display controller 141 causes the display unit 11 to display a status screen 172 as shown in FIG. 13A. The status screen 172 shows, for example, a message "NO MALFUNCTION HAS OCCURRED" appears in a malfunction display area 172*a* of the status screen 172.

If the malfunction information table 138a holds some information therein, the display controller 141 obtains the malfunction message information from the malfunction message field 138c, and then adds the malfunction message information, into a predetermined area of the image data that describes a status screen obtained from the screen information memory 135, thereby producing the display data DD. The display controller 141 sends the thus produced display data DD to the human interface unit 110. The human interface unit 110 in turn causes the display unit 111 to display the status screen described by the display data DD.

Figure 13B:
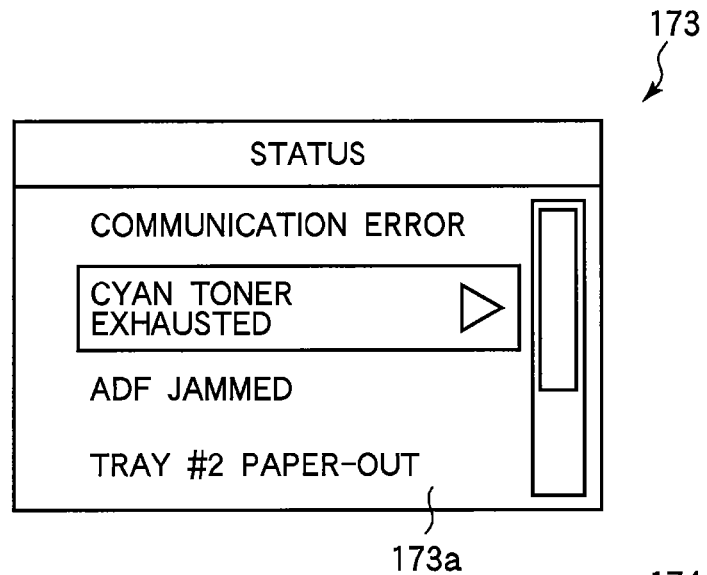
FIG. 13B illustrates another status screen.

FIG. 13B illustrates a status screen 173.

The display controller 141 causes the display unit 111 to display the status screen 173. A malfunction display area 173a shows malfunction messages represented by the malfunction message information obtained from the malfunction information table 138a. The malfunction messages may be displayed separately for the printer function, scanner function, and fax function.

Next, the display controller 141 waits for an event that requires the display controller 141 to address (S41). If such an event occurs, the display controller 141 proceeds to S42.

At S42, the display controller 141 makes a decision to determine whether the event requires a malfunction list to be re-displayed. For example, if the display controller 141 receives malfunction update information TD from the malfunction detecting section 140, the display controller 141 determines that the event requires the malfunction list to be re-displayed (YES at S42), and then the display controller 141 returns to S40. If the event does not require the malfunction list to be re-displayed (NO at S42), the display controller 141 proceeds to S43.

At S43, the display controller 141 makes a decision to determine whether the event requires the status screen to be terminated. If the key information KD received from the function identifier 132 indicates depression of one of the copy key 112, scan key 113, print key 114, and fax key 115, the display controller 141 determines that the event requires the status screen to be terminated. If the event requires the status screen to be terminated (YES at S43), the display controller 141 terminates the processing. If the event does not require the status screen to be terminated (NO at S43), the display controller 141 proceeds to S44.

At S44, the display controller 141 makes a decision to determine whether the event requires the troubleshooting instruction to be displayed. For example, a malfunction message "CYAN TONER EXHAUSTED" is highlighted in the malfunction display area 173a of the status screen 173 (FIG. 13B). A right arrow key appearing on the right side of the malfunction message "CYAN TONER EXHAUSTED" shown in FIG. 13B indicates the right arrow key of the selection key 117 for the user to depress if he wants to know what to do. If the user depresses the right arrow key of the selection key 117, the display controller 141 receives key information KD from the function identifier 132 and determines that the event requires the troubleshooting instruction to be displayed. The display controller 141 then proceeds to S45 if the event requires the troubleshooting instruction to be displayed, or jumps back to S41 if the event does not require the troubleshooting instruction to be displayed (NO at S44).

Figure 13C:
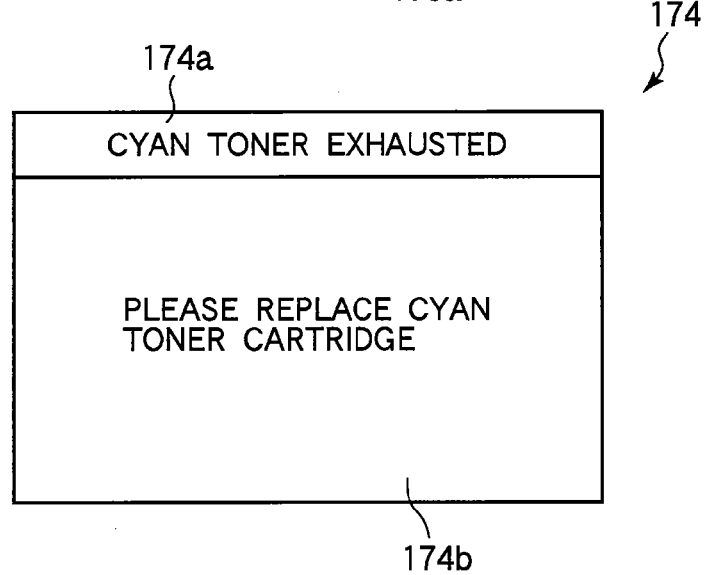
FIG. 13C illustrates a troubleshooting instruction screen.

At S45, the display controller 141 causes the display unit 111 to display a troubleshooting instruction screen 174 FIG. 13C) that displays the troubleshooting instruction.

The display controller 141 obtains the malfunction type ERI, which corresponds to the malfunction message information representing malfunction message selected from the status screen, from the malfunction information table 138a. The display controller 141 then obtains the troubleshooting instruction information, which corresponds to the malfunction type ERI, from the troubleshooting instruction table 139a held in the troubleshooting instruction memory 139. The display controller 141 then adds the thus obtained troubleshooting instruction information and malfunction message information into corresponding areas of the image data that describes the troubleshooting instruction screen, thereby producing the display data DD. The display controller 141 sends the thus produced display data DD to the human interface unit 110, which in turn causes the display unit 111 to display the troubleshooting instruction screen 174 (FIG. 13C) described by the display data DD.

FIG. 13C illustrates troubleshooting instruction screen 174. A malfunction message area 174a of the troubleshooting instruction screen 174 holds the malfunction message, e.g., "CYAN TONER EXHAUSTED," selected from the status screen.

A troubleshooting instruction area 174b holds troubleshooting instructions, e.g., "PLEASE REPLACE CYAN TONER CARTRIDGE," represented by the troubleshooting instruction information obtained from the troubleshooting instruction table 139a.

The display controller 141 waits for an event that requires the display controller 141 to address (S46). The display controller 141 proceeds to S47 if such an event occurs.

At S47, the display controller 141 makes a decision to determine whether the event requires the malfunction list to be displayed. If the event requires the malfunction list to be displayed (YES at S47), the display controller 141 jumps back to S40. If the event does not require the malfunction list to be displayed (NO at S47), the display controller 141 proceeds to S48.

At S48, the display controller 141 makes a decision to determine whether the event requires the status screen to be terminated. If the event requires the status screen to be terminated (YES at S48), the display controller 141 terminates the processing. If the event does not require the status screen to be terminated (NO at S48), the display controller 141 jumps back to S46.

As described above, if one of the copy key 112, scan key 113, print key 114, and fax key 115 is depressed, the human interface unit 110 displays information indicative of a malfunction occurring in a device that is to perform a function corresponding to the depressed function selection key (i.e., copy key 112, scan key 113, print key 114, or fax key 115). Therefore, once the displayed malfunction has been remedied, the function corresponding to the depressed function selection key can be performed. If all items of information about all malfunctions occurring within the multifunction printer are to be displayed, the status key 116 can be depressed. Thus, only messages involved in performing the functions can be displayed when the functions of the multifunction printer 100 are to be performed, while only messages necessary for maintenance can be displayed when the multifunction printer is maintained.

Second Embodiment

Overall Configuration

Figure 14:
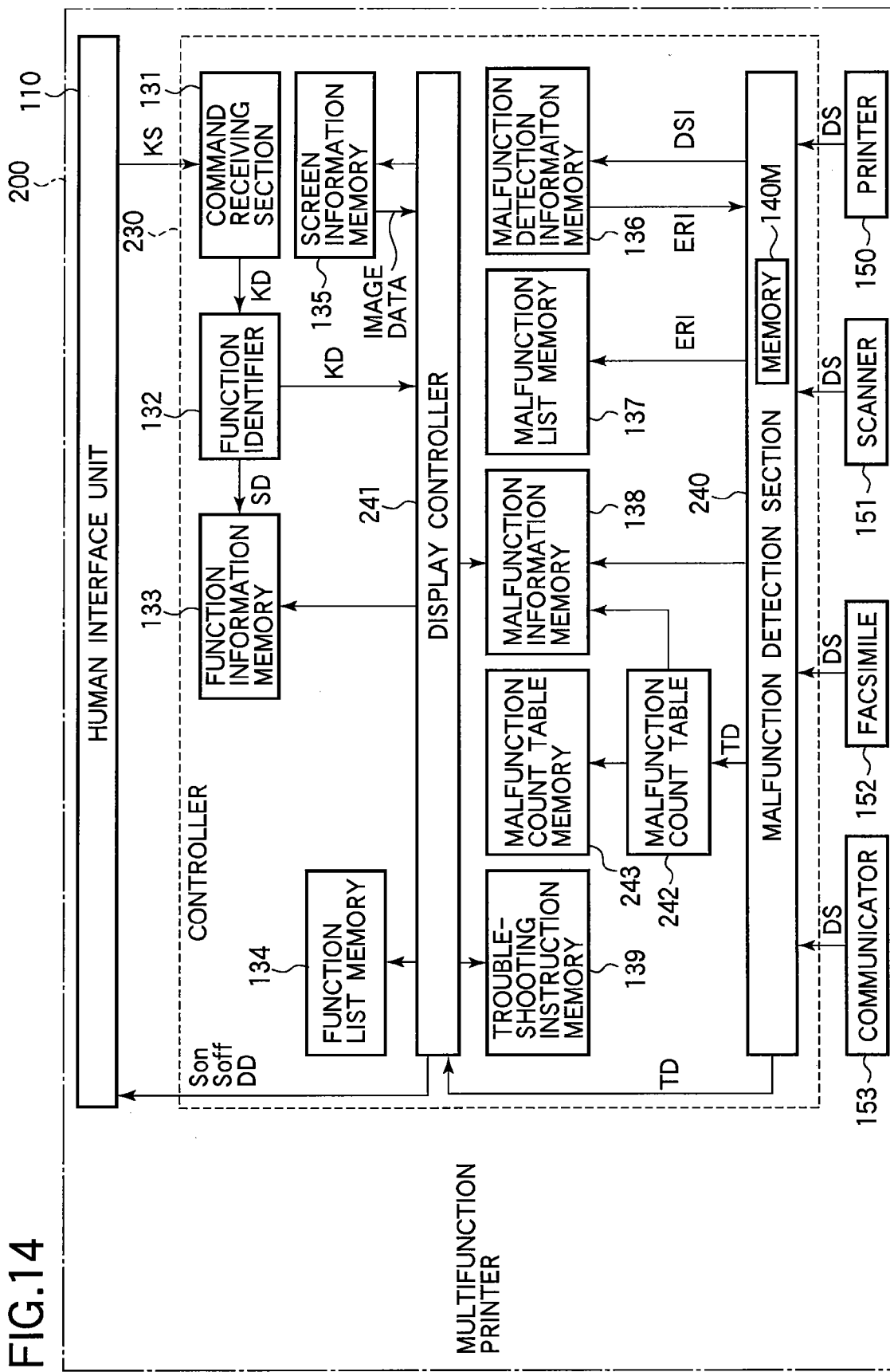
FIG. 14 is a block diagram illustrating the outline of a multifunction printer according to a second embodiment.

FIG. 14 is a block diagram illustrating the outline of a multifunction printer 200 according to a second embodiment. The multifunction printer 200 includes a human interface unit 110, a controller 230, a printer 150, a scanner 151, a facsimile 152, and a communicator 153. The multifunction printer 200 differs from the multifunction printer 100 in that the controller 230 is employed in place of the controller 130.

The controller 230 includes a command receiving section 131, a function identifier 132, a function information memory 133, a function list memory 134, a screen information memory 135, a malfunction detection information memory 136, a malfunction list memory 137, a malfunction information memory 138, a troubleshooting instruction memory 139, a malfunction detecting section 240, a display controller 241, a malfunction counter 242, and a malfunction count memory 243. The controller 230 is configured in a similar way to the controller 130. However, the controller 230 differs from the controller 130 in that the malfunction detecting section 240 and display controller 241 perform the processing of data and information, and in that the malfunction counter 242 and malfunction count memory 243 are additionally employed.

The malfunction detecting section 240 performs processing similar to that of the malfunction detecting section 140 but differs from the first embodiment in that when a malfunction information table 138a held in a malfunction information memory 138 is updated, malfunction update information TD is sent to the display controller 241 and the malfunction counter 242.

By referring to the malfunction information memory 138, the malfunction counter 242 classifies malfunctions occurring within the multifunction printer 200 in terms of devices that perform corresponding functions, thereby producing malfunction count information. The malfunction count information represents the total number of malfunctions that have occurred in the respective devices and have not been remedied yet. The malfunction count information for each device is then stored into the malfunction count memory 243. In response to the malfunction update information TD from the malfunction detecting section 240, the malfunction counter 242 produces the malfunction count information for each device.

Figure 15:
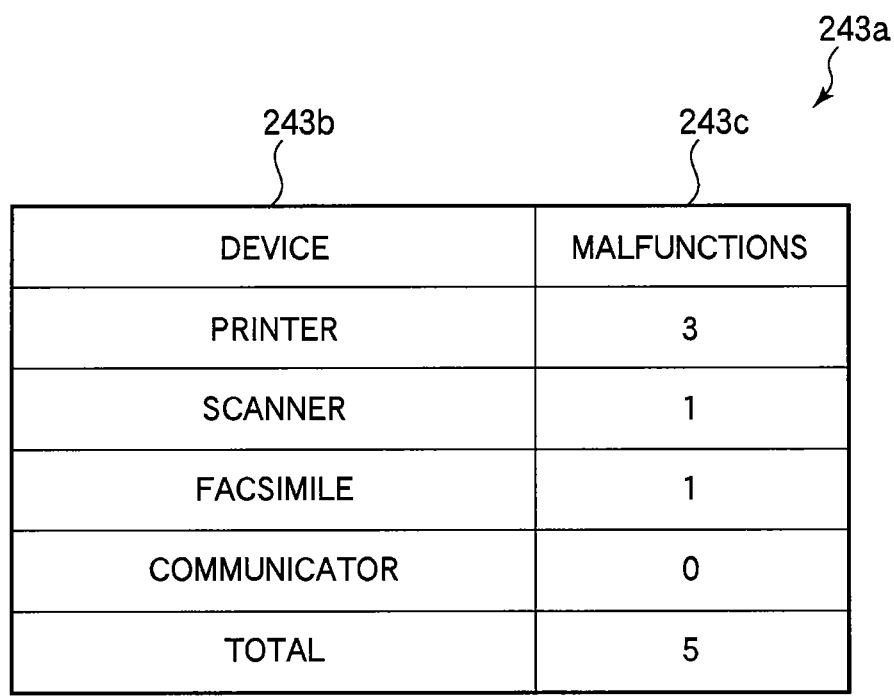
FIG. 15 illustrates a malfunction count table.

FIG. 15 illustrates a malfunction count table 243a. The malfunction count memory 243 holds the malfunction count information for each device in the malfunction count table 243a. The malfunction count table 243a includes a device field 243b and a number-of-malfunctions field 243c.

The device field 243b holds device identifying information that identifies devices that perform corresponding functions of the multifunction printer 200.

The number-of-malfunctions field 243c holds the number of malfunctions indicative of the total number of malfunctions that have occurred in respective devices and have not been remedied yet.

The display controller 241 performs similar processing to the first embodiment. However, when a status key 116 (FIG. 2) is depressed, the display controller 241 performs processing in a way different from the display controller 141. If key information KD received from the function identifier 132 indicates the depression of the status key 116, the display controller 241 obtains image data that describes a status screen from the screen information memory 135. The display controller 241 then adds the device identifying information and the number of malfunctions, which have been obtained from the malfunction count table 243a, into the corresponding areas of the image data that describes the status screen, thereby producing display data DD. The display controller 241 then sends the thus produced display data DD to the human interface unit 110.

{Detecting Malfunction and Remedy}

Figure 16:
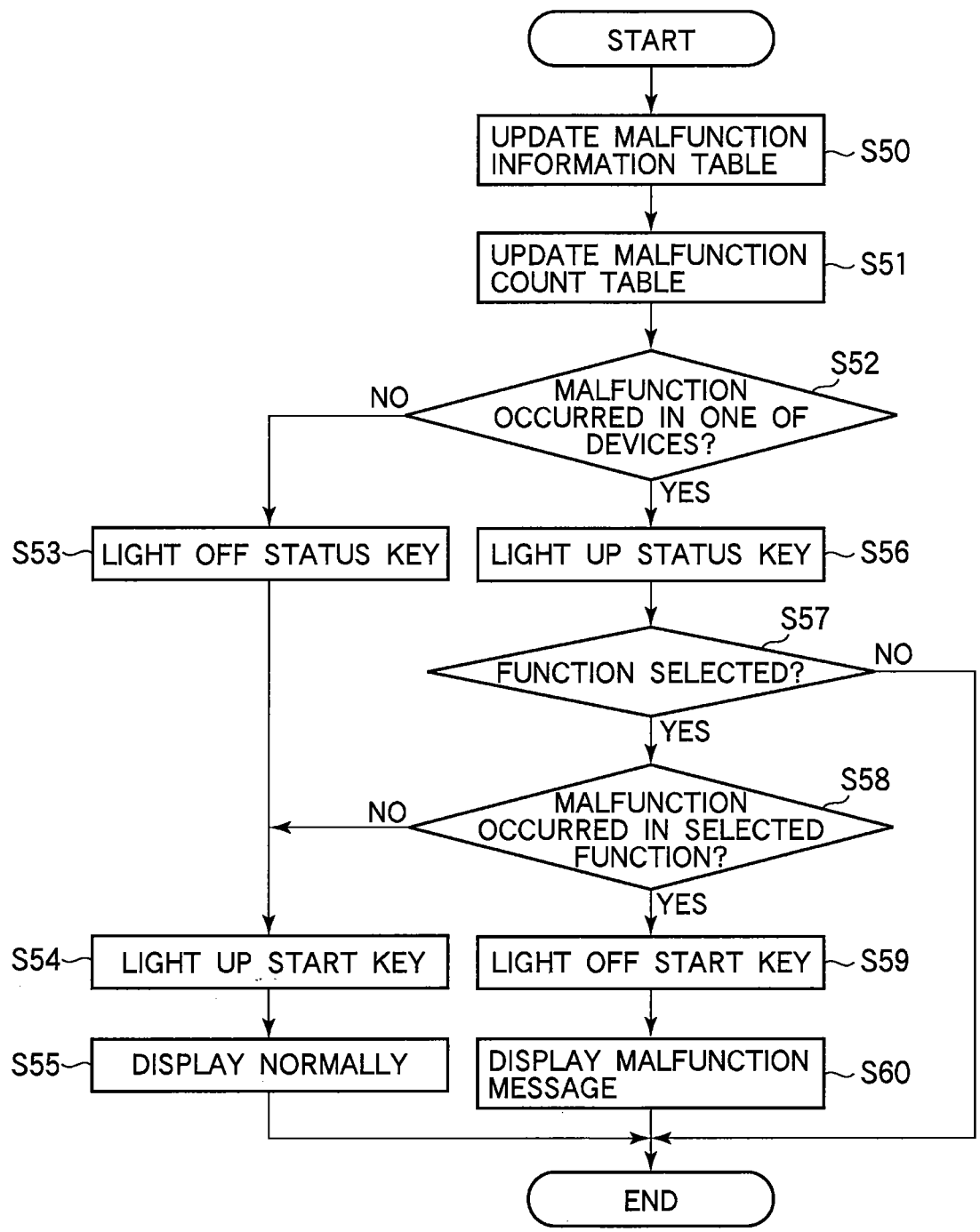
FIG. 16 is a flowchart illustrating detection of a malfunction and remedy of the malfunction.

FIG. 16 is a flowchart illustrating the detection of a malfunction and remedy of the malfunction.

If the malfunction detecting section 240 detects that a malfunction occurred in one of the printer 150, scanner 151, facsimile 152, and communicator 153, or that the malfunction has been remedied, the malfunction detecting section 240 updates the malfunction information table 138a (S50). Upon update of the malfunction information table 138a, the malfunction detecting section 240 sends the malfunction update information TD to the display controller 241 and malfunction counter 242.

In response to the malfunction update information TD, the malfunction counter 242 counts the number of items of device identifying information held in the device field 138e of the malfunction information table 138a (FIG. 5) for each device (i.e., printer 150, scanner 151, facsimile 152, and communicator 153), thereby obtaining the number of malfunctions for each device. The malfunction counter 242 produces the malfunction count table 243a that lists the items of device identifying information and the number of malfunctions associated with each of the items of device identifying information. The malfunction count table 243a is then stored into the malfunction count memory 243, thereby updating the malfunction count table 243a (S51).

In response to the malfunction update information TD, the display controller 241 makes a decision to determine whether a malfunction has occurred in any one of the printer 150, scanner 151, facsimile 152, and communicator 153 (S52). If a malfunction has occurred (YES at S52), the display controller 241 proceeds to S56. If a malfunction has not occurred (NO at S52), the display controller 241 proceeds to S53.

At S53, the display controller 241 causes the light emitting element of the status key 116 to light off. The display controller 241 then proceeds to S54.

If the light emitting element has already lighted off, the panel controller 121 maintains the light-off state of the light emitting element.

At S54, the display controller 241 causes the light emitting element in a start key 119 to light up.

If the light emitting element has already lighted up, the panel controller 121 of the human interface unit 110 maintains the light-on state of the light emitting element.

At S55, the display controller 241 sends the display data DD, which describes a function screen, to the human interface unit 110. This function screen shows that no malfunction has occurred in a device that is to perform the selected function. The human interface unit 110 causes the display unit 111 to display the function screen described by the display data DD.

At S56, the display controller 241 causes the light emitting element of the status key 116 to light up. The display controller 241 then proceeds to S57.

If the light emitting element has already lighted up, a panel controller 121 of the human interface unit 110 maintains the light-on state of the light emitting element.

At S57, the display controller 241 refers to the function information memory 133, thereby determining whether one of the copy key 112, scan key 113, print key 114, and fax key 115 has been depressed. If one of the copy key 112, scan key 113, print key 114, and fax key 115 has been depressed (YES at S57), the display controller 241 proceeds to S58. If none of the function selection key has not been depressed (NO at S57), the display controller 241 terminates the processing.

At S58, the display controller 241 makes a decision to determine whether a malfunction has occurred in a device that is to perform the selected function. If a malfunction has not occurred (NO at S58), the display controller 241 proceeds to S54. If a malfunction has occurred (YES at S58), the display controller 241 proceeds to S59.

Figure 17A:
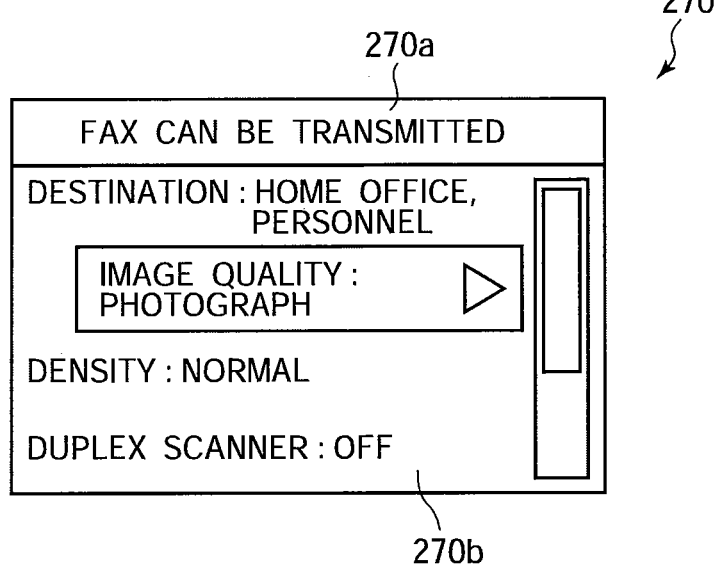
FIG. 17A illustrates a function screen.

FIG. 17A illustrates a function screen 270. The display unit 111 displays the function screen 270. The function screen 270 is, for example, a fax function screen for a fax function. The function screen 270 includes a status area 270a and a parameter area 270b.

The status area 270a shows a string of characters, e.g., "FAX CAN BE TRANSMITTED" indicating that no malfunction exists in the fax machine.

The parameter area 270b shows parameters to be selected when the fax function is to be used. The parameters can be selected by means of the selection key 117. A right arrow key appearing on the right side of the malfunction message "IMAGE QUALITY: PHOTOGRAPH" shown in FIG. 17A indicates the right arrow key of the selection key 117 for the user to depress if he wants to command. The selected parameter is enclosed by a box which enables the user to recognize visually his selection.

At S59, the display controller 241 causes the light emitting element of the start key 119 to light off.

If the light emitting element has already lighted off, the display controller 241 maintains the light-off state of the light element.

At S60, the display controller 241 sends the display data DD, which describes a function screen, to the human interface unit 110. This function screen shows that a malfunction has occurred in the device that is to perform the selected function. The human interface unit 110 causes the display unit 111 to display the function screen described by the display data DD.

Figure 17B:
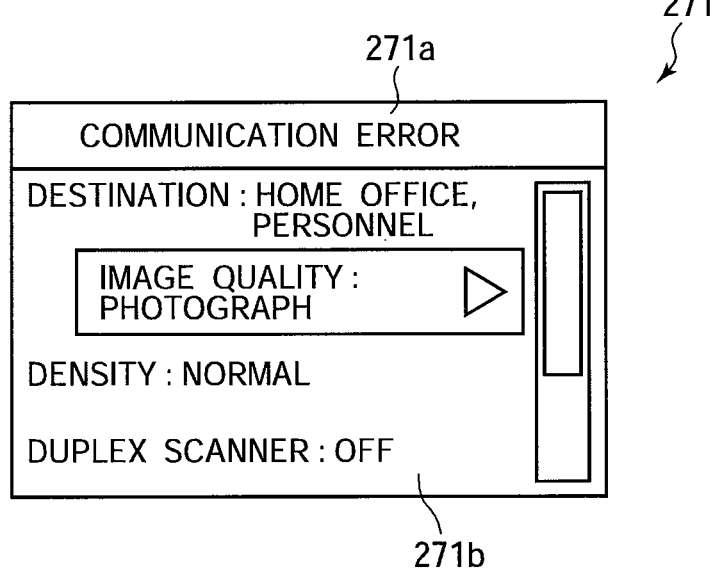
FIG. 17B illustrates the function screen displayed on the display unit.

FIG. 17B illustrates a function screen 271 displayed on the display unit 111. The function screen 271 is a fax function screen when the fax function has been selected. The function screen 271 includes a status area 271a and a parameter area 271b.

The status area 271a shows a malfunction message "COMMUNICATION ERROR" indicative of a malfunction in a device that is to perform the function.

The malfunction message shown in the status area 271a is represented by the malfunction message information obtained from the malfunction message filed 138c (FIG. 5).

{Displaying Malfunction Messages and Troubleshooting Instructions}

FIG. 18 is a flowchart illustrating the processing of displaying malfunction messages and troubleshooting instructions.

The display controller 241 causes the display unit 111 to display the status screen that shows the malfunction count (S70). The display controller 241 then obtains the image data, which describes the status screen, from the screen information memory 135. The display controller 241 adds the device identifying information and the number of malfunctions, which have been obtained from the malfunction count table 243a held in the malfunction count memory 243, into corresponding areas of the image data that describes the status screen, thereby producing the display data DD. The display controller 241 then sends the display data DD to the human interface unit 110, which in turn causes the display unit 111 to display the status screen described by the display data DD.

Figure 19A:
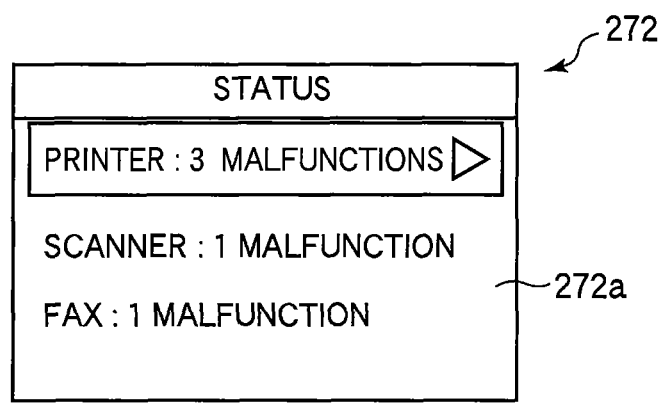
FIG. 19A illustrates a status screen displayed on the display unit.

FIG. 19A illustrates a status screen 272 displayed on the display unit 111.

Figure 19B:
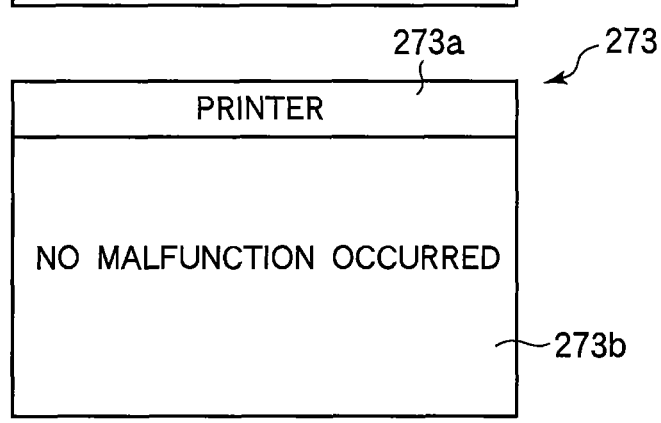
FIG. 19B illustrates a malfunction list screen.

FIG. 19B illustrates a malfunction list screen 273.

The status screen 272 shows the device identifying information and the corresponding number of malfunctions, which have been obtained from the malfunction count table 243a held in the malfunction count memory 243. The device identifying information and the number of malfunctions are processed before they are displayed in a predetermined display form.

The display controller 241 waits for an event that requires the display controller 241 to address (S71). If such an event occurs, the display controller 241 proceeds to S72. At S72, the display controller 241 makes a decision to determine whether the event requires the malfunction count to be re-displayed. For example, if the display controller 241 receives the malfunction update information TD from the malfunction detecting section 240, the display controller 241 determines that the event requires the malfunction count to be redisplayed. If the event requires the malfunction count to be re-displayed (YES at S72), the display controller 241 jumps back to S70. If the event does not require the malfunction count to be re-displayed (NO at S72), the display controller 241 proceeds to S73.

At S73, the display controller 241 makes a decision to determine whether the event requires the status screen to be terminated. If the key information KD received from the function identifier 132 indicates that the function selection key has been depressed, the display controller 241 determines that the event requires the status screen to be terminated. If the event requires the status screen to be terminated (YES at S73), the display controller 241 terminates the processing. If the event does not require that status screen to be terminated (NO at S73), the display controller 241 proceeds to S74.

At S74, the display controller 241 makes a decision to determine whether the event requires all malfunctions to be displayed. A right arrow key appearing on the right side of the malfunction message "PRINTER: 3 MALFUNCTIONS" shown in FIG. 19A indicates the right arrow key of the selection key 117 for the user to depress if he wants to know what to do. If the user depresses the right arrow key of the selection key 117, the display controller 241 receives key information KD from the function identifier 132, and determines that the event requires all the malfunctions to be displayed. If the event requires all the malfunctions to be displayed YES at S74), the display controller 241 proceeds to S75. If the event does not require all the malfunctions to be displayed (NO at S74), the display controller 241 jumps back to S71.

At S75, the display controller 241 causes the display unit 111 to display a malfunction list screen in which all the malfunctions occurring within the multifunction printer are displayed. If the device identifying information selected on the status screen does not appear in the device field 138e of the malfunction information table 138a, the display controller 241 adds message information indicative of non-occurrence of malfunction into a predetermined area of the image data obtained from the screen information memory 135. The display controller 241 then sends display data DD, to which the message information has been added, to the human interface unit 110. The human interface unit 110 in turn causes the display unit 111 to display the status screen described by the display data DD. Specifically, the display controller 241 causes the display unit 111 to display the malfunction list screen 273 as shown in FIG. 19B. A string of characters "PRINTER" represented by the device identifying information selected on the status screen 272 appears in the malfunction device area 273a of the malfunction list screen 273. A message "NO MALFUNCTION OCCURRED" indicating that no malfunction has occurred appear sin the malfunction display area 273b. If the device identifying information selected on the status screen of the malfunction count appears in the device field 138e, the display controller 241 obtains the malfunction message information from the malfunction message filed 138c. The display controller 241 adds the malfunction message information, which is obtained from the malfunction information table 138a (FIG. 5), into a predetermined area in the image data that describes the malfunction list screen obtained from the screen information memory 135, thereby producing the display data DD. The display controller 241 then sends the thus obtained display data DD to the human interface unit 110. The human interface unit 110 in turn causes the display unit 111 to display the malfunction list screen described by the display data DD.

Figure 19C:
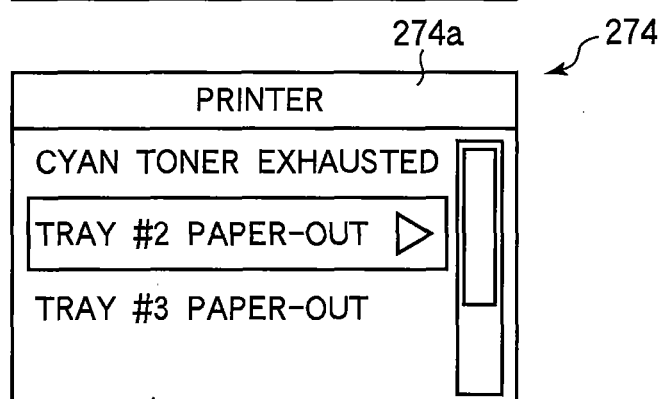
FIG. 19C illustrates a malfunction list screen.

FIG. 19C illustrates a malfunction list screen 274. A string of characters "PRINTER" represented by the device identifying information selected on the status screen 272 appears in the malfunction device area 274a of the malfunction list screen 274. The malfunction messages represented by the malfunction information table 138a (FIG. 5) appears in the malfunction display area 274b.

The display controller 241 waits for an event that requires the display controller 241 to address (S76). If such an event occurs, the display controller 241 proceeds to S77. At S77, the display controller 241 makes a decision to determine whether the event requires the malfunction count to be re-displayed. If the event requires the malfunction count, to be re-displayed. the display controller 241 jumps back to S70. If the event does not require the malfunction count to be re-displayed (NO at S77), the display controller 241 proceeds to S78.

At S78, the display controller 241 makes a decision to determine whether the event requires the status screen to be terminated. If the event requires the status screen to be terminated (YES at S78), the display controller 241 terminates the proceeding. If the event does not require the status screen to be terminated (NO at S78), the display controller 241 proceeds to S79.

At S79, the display controller 241 makes a decision to determine whether the event requires the troubleshooting instruction to be displayed. A right arrow key appearing on the right side of the malfunction message "TRAY #2 PAPER—OUT" shown in FIG. 19C indicates the right arrow key of the selection key 117 for the user to depress if he wants to know what to do. If the user depresses the right arrow key of the selection key 117, the display controller 241 receives key information KD from the function identifier 132 and determines that the event requires the troubleshooting instruction to be displayed. If the event requires troubleshooting instruction to be displayed (YES at S79), the display controller 241 proceeds to S80. If the event does not require troubleshooting instruction to be displayed (NO at S79), the display controller 241 jumps back to S76.

At S80, the display controller 241 causes the display unit 111 to display the screen for the troubleshooting instruction screen that displays the troubleshooting instruction.

Figure 19D:
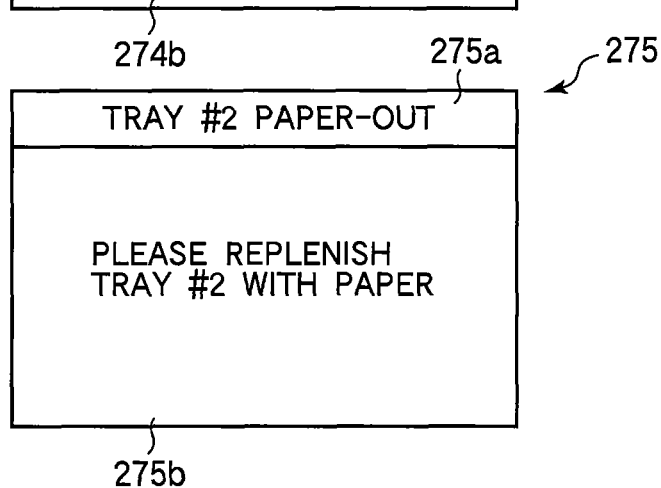
FIG. 19D illustrates a troubleshooting instruction screen.

FIG. 19D illustrates a troubleshooting instruction screen 275. The display controller 241 obtains the malfunction type ERI, which corresponds to the malfunction message information representing malfunction message selected from the status screen, from the malfunction information table 138a. The display controller 241 then obtains the troubleshooting instruction information, which corresponds to the malfunction type ERI, from the troubleshooting instruction table 139a held in the troubleshooting instruction memory 139. The display controller 241 then adds the thus obtained troubleshooting instruction information and malfunction message information into corresponding areas of the image data that describes the troubleshooting instruction screen, thereby producing the display data DD. The display controller 241 then sends the thus produced display data DD to the human interface unit 110, which in turn causes the display unit 111 to display the troubleshooting instruction screen 275 described by the display data DD. The malfunction message area 275a of the troubleshooting instruction screen 275 holds the malfunction message selected from the malfunction list screen and the troubleshooting instruction information held in a troubleshooting instruction area 275b holds troubleshooting instructions represented by the troubleshooting instruction information obtained from the troubleshooting instruction table 139a.

The display controller 241 waits for an event that requires the display controller 241 to address (S81). If such an event occurs, the display controller 241 proceeds to S82.

At S82, the display controller 241 makes a decision to determine whether the event requires the malfunction count to be re-displayed. If such an event occurs (YES at S82), the display controller 241 jumps back to S70. If the event does not require the malfunction count to be re-displayed (NO at S82), the display controller 241 proceeds to S83.

At S83, the display controller 241 makes a decision to determine whether the event requires the status screen to be terminated. If the event requires the status screen to be terminated (YES at S83), the display controller 241 terminates the processing. If the event does not require the status screen to be terminated (NO at S83), the display controller 241 jumps back to S81.

As described above, even when the status key 116 is depressed, the malfunction counter 242 classifies malfunctions occurring within the multifunction printer 200 in terms of devices that perform corresponding functions, so that the malfunctions are displayed in classified form. This enables the malfunctions to be remedied on a device-to-device basis.

In the first and second embodiments, the display controllers 141 and 241 send the display data DD, which is obtained by adding the malfunction message information to the image data that describes the function screen, to the human interface unit 110. When the display unit displays a function screen described by the display data DD, if a specific input key, e.g., the confirmation key 118 that confirms the selection of an area in which the malfunction message is shown, the troubleshooting instructions corresponding to the selected the malfunction message may be displayed on the display unit 111. For example, the display controller 141 or 241 selects the status area 171a of the function screen 171 shown in FIG. 9A or the status area 271a of the function screen 271 shown in FIG. 17B, and then the confirmation key 118 is depressed so that the troubleshooting instructions corresponding to the selected malfunction message is displayed on the display unit 111.

The display controllers 141 and 241 obtain the malfunction type ERI, which corresponds to the malfunction message information representing malfunction message selected from the status screen, from the malfunction information table 138a. The display controllers 141 and 241 then obtain the troubleshooting instruction information, which corresponds to the malfunction type ERI, from the troubleshooting instruction table 139a held in the troubleshooting instruction memory 139.

The display controllers 141 and 241 then add the thus obtained troubleshooting instruction information and malfunction message information into corresponding areas of the image data that describes the troubleshooting instruction screen, thereby producing the display data DD. The display controllers 141 and 241 then send the thus produced display data DD to the human interface unit 110, which in turn causes the display unit 111 to display the troubleshooting instruction screen 275 described by the display data DD.

The invention being thus described, it will be obvious that the same may be varied in many ways. Such variations are not to be regarded as a departure from the scope of the invention, and all such modifications as would be obvious to one skilled in the art are intended to be included within the scope of the following claims.

What is claimed is:

1. A multifunction apparatus capable of performing a plurality of functions, each function being performed by a corresponding device incorporated in the multifunction apparatus, the multifunction apparatus comprising:
   a display unit;
   a malfunction detecting section configured to detect a malfunction that has occurred within the multifunction apparatus; and
   a display controller configured to control the display unit;
   a command inputting section through which a user inputs a command;
   wherein when the malfunction detecting section has detected a first malfunction associated with a predetermined function and a second malfunction not associated with the predetermined function, if a user selects the predetermined function, the display controller causes the display unit to display only a first malfunction message indicative of the first malfunction, and
   when the malfunction detecting section has detected the first malfunction and the second malfunction, if the user inputs a display command through the command inputting section, the display controller causes the display unit to display simultaneously the first malfunction message and a second malfunction message indicative of the second malfunction.

2. The multifunction apparatus according to claim 1, further comprising:
   a malfunction information memory that stores items of malfunction information, each item of malfunction information including an item of malfunction message information and a corresponding item of device identifying information, one item of malfunction information including an item of malfunction message information indicative of the first malfunction message;
   wherein when the malfunction detecting section receives a malfunction detection signal from a malfunctioning device, the malfunction detecting section stores an item of malfunction information indicative of the malfunctioning device into the malfunction information memory;
   wherein the display controller obtains the item of malfunction message information from the items of malfunction information, and then causes the display unit to display the first malfunction message represented by the obtained item of malfunction message information.

3. The multifunction apparatus according to claim 2, wherein the each item of malfunction information further includes priority information indicative of a priority levels of the item of the malfunction message information in being displayed on the display unit;
   wherein the display controller obtains an item of the malfunction message information having the highest priority level of the items of malfunction message information, and causes the display unit to display the first malfunction message represented by the item of malfunction message information having the highest priority level.

4. The multifunction apparatus according to claim 3, wherein if a plurality of items of malfunction message information have the highest priority level, the display controller causes the display unit to display the plurality of first malfunction messages corresponding to the plurality of items of malfunction message information in a cyclic manner.

5. The multifunction apparatus according to claim 2, further comprising a function list memory that stores items of function information, each item of function information including a function and a corresponding item of device identifying information indicative of a device that should perform a selected function;
   wherein when the predetermined function is selected, the display controller obtains an item of device identifying information from the function list memory, the item of device identifying information corresponding to the selected predetermined function.

6. The multifunction apparatus according to claim 1, wherein the display unit and the command inputting section are disposed in a human interface unit.

7. The multifunction apparatus according to claim 1, wherein the command inputting section includes hardware keys.

8. A multifunction apparatus capable of performing a plurality of functions, each function being performed by a corresponding device incorporated in the multifunction apparatus, the multifunction apparatus comprising:
   a display unit;
   a malfunction detecting section configured to detect a malfunction that has occurred within the multifunction apparatus;
   a display controller configured to control the display unit;
   a command inputting section through which a user inputs a command;
   a malfunction counter configured to count a number of malfunctions that have occurred in a corresponding device and have not been remedied yet, the malfunction counter producing malfunction count information including of device identifying information indicative of the device in which the malfunctions have occurred and number-of-malfunctions information indicative of a corresponding number of malfunctions; and
   a malfunction count memory that stores the produced malfunction count information therein;
   wherein when the malfunction detecting section has detected a first malfunction associated with a predetermined function and a second malfunction not associated with the predetermined function, if the user selects the predetermined function, the display controller causes the display unit to display only a malfunction message indicative of the first malfunction;
   wherein when the user inputs a display command through the command inputting section, the display controller causes the display unit to display the device identifying information and the number-of-malfunctions information.

9. The multifunction apparatus according to claim 8, wherein when the display unit is displaying the device identifying information and the number-of-malfunctions information, if the user inputs a command to select the malfunctioning device through the command inputting section, if the display controller causes the display unit to display a malfunction message associated with the selected malfunctioning device.

* * * * *